United States Patent
Takahashi et al.

(10) Patent No.: US 8,848,077 B2
(45) Date of Patent: Sep. 30, 2014

(54) IMAGING APPARATUS AND IMAGING METHOD

(71) Applicant: FUJIFILM Corporation, Tokyo (JP)

(72) Inventors: Kousuke Takahashi, Saitama (JP);
Noriko Kawamura, Saitama (JP);
Tomoyuki Kawai, Saitama (JP); Seiji Tanaka, Saitama (JP); Tetsuro Ashida, Saitama (JP); Takehiro Kouguchi, Saitama (JP); Hisashi Endo, Saitama (JP); Tomoki Inoue, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 105 days.

(21) Appl. No.: 13/724,200

(22) Filed: Dec. 21, 2012

(65) Prior Publication Data

US 2013/0113965 A1  May 9, 2013

Related U.S. Application Data

(63) Continuation of application No. PCT/JP2011/061101, filed on May 13, 2011.

(30) Foreign Application Priority Data

Jun. 22, 2010  (JP) ................................. 2010-142000

(51) Int. Cl.
  *H04N 3/16* (2006.01)
  *H04N 9/04* (2006.01)

(52) U.S. Cl.
  USPC .......................................... 348/294; 348/235

(58) Field of Classification Search
  USPC ................ 348/223.1, 235, 294, 308
  See application file for complete search history.

(56) References Cited

U.S. PATENT DOCUMENTS

| | | | | |
|---|---|---|---|---|
| 6,803,955 | B1 * | 10/2004 | Yosida | 348/272 |
| 2004/0135899 | A1 * | 7/2004 | Suemoto | 348/223.1 |
| 2004/0189821 | A1 * | 9/2004 | Oda et al. | 348/223.1 |
| 2007/0223059 | A1 | 9/2007 | Oishi | |
| 2010/0073514 | A1 | 3/2010 | Hayashi | |

FOREIGN PATENT DOCUMENTS

| | | | |
|---|---|---|---|
| JP | 2004-289728 | A | 10/2004 |
| JP | 2005-80190 | A | 3/2005 |
| JP | 2007-124137 | A | 5/2007 |
| JP | 2007-259344 | A | 10/2007 |
| JP | 2008-270832 | A | 11/2008 |
| JP | 2009-268078 | A | 11/2009 |
| JP | 2010-74635 | A | 4/2010 |

* cited by examiner

*Primary Examiner* — Gevell Selby
(74) *Attorney, Agent, or Firm* — Birch, Stewart, Kolasch & Birch, LLP

(57) ABSTRACT

An imaging apparatus includes a solid-state imaging device that has a plurality of pairs of a first photoelectric conversion element and a second photoelectric conversion element, which have different spectral sensitivity characteristics, respectively. A wavelength range where the first photoelectric conversion element of each pair mainly has a spectral sensitivity and a wavelength range where the second photoelectric conversion element of the pair mainly has a spectral sensitivity fall within wavelength ranges of specific colors of visible light respectively. The plurality of pairs include a plurality of types of pairs having different specific colors. A half-width in a spectral sensitivity characteristic of the second photoelectric conversion element of each pair is wider than a half width in a spectral sensitivity characteristic of the first photoelectric conversion element of the pair.

24 Claims, 11 Drawing Sheets they are provided thereabove, respectively. However, Patent
IMAGING APPARATUS AND IMAGING METHOD

CROSS REFERENCE TO RELATED APPLICATIONS

This application is a Continuation of PCT International Application No. PCT/JP2011/061101 filed on May 13, 2011, which claims priority under 35 U.S.C. §119(a) to Patent Application No. 2010-142000 filed in Japan on Jun. 22, 2010, all of which are hereby expressly incorporated by reference into the present application.

TECHNICAL FIELD

The present invention relates to an imaging apparatus and an imaging method.

BACKGROUND ART

Up to now, several imaging apparatuses have been proposed, which are equipped with a solid-state imaging device including two types of photoelectric conversion element groups capable of obtaining signals with different sensitivities (see, e.g., Patent Documents 1 to 3).

An imaging apparatus disclosed in Patent Document 1 has a solid-state imaging device that includes pairs of pixel sections, each pair having two photoelectric conversion elements, which have red color filters different in wavelength selectivity provided thereabove, respectively, pairs of pixel sections, each pair having two photoelectric conversion elements, which have green color filters different in wavelength selectivity, respectively provided thereabove, and pairs of pixel sections, each pair having two photoelectric conversion elements, which have blue color filters different in wavelength selectivity provided thereabove, respectively. Thus, the imaging apparatus realizes an improvement in color reproducibility by combining signals obtained from the two photoelectric conversion elements of each pair of pixel sections.

When an imaging is performed by the imaging apparatus disclosed in Patent Document 1, brightness of a subject to be imaged by the imaging apparatus is changed according to the environment, and thus, the optimal color reproducibility by the brightness is required to be obtained. However, Patent Document 1 does not consider that the obtaining the optimal color reproducibility by the brightness.

Patent Document 2 discloses a solid-state imaging device that includes primary and secondary photosensitive sections in which light-receiving areas thereof are different from each other and color filters having different spectral characteristics are provided thereabove, respectively. However, Patent Document 2 is mainly directed to an improvement in discrimination precision of an illuminating light source, and does not consider an improvement of the color reproducibility.

Patent Document 3 discloses a solid-state imaging device that includes a plurality of pairs of two photoelectric conversion elements, which are equal to or different from each other in photoelectric conversion sensitivity. However, Patent Document 3 mentions only the expansion of a dynamic range, but does not disclose an improvement of the color reproducibility.

PRIOR ART DOCUMENT

Patent Literature

[Patent Document 1] JP-2009-268078 A
[Patent Document 2] JP-2004-289728 A
[Patent Document 3] JP-2008-270832 A

SUMMARY OF THE INVENTION

Problems to be Solved

The present invention has been made taking the above-described status into consideration, and an object of the present invention is to provide an imaging apparatus and an imaging method which are capable of obtaining an image with optimal color reproducibility under a wide range of light intensity conditions.

Means for Solving the Problems

The present invention provides an imaging apparatus including a solid-state imaging device that has a plurality of pairs of a first photoelectric conversion element and a second photoelectric conversion element, which have different spectral sensitivity characteristics, respectively. A wavelength range where the first photoelectric conversion element of each pair mainly has a spectral sensitivity and a wavelength range where the second photoelectric conversion element of the pair mainly has a spectral sensitivity fall within wavelength ranges of specific colors of visible light respectively. The plurality of pairs include a plurality of types of pairs having different specific colors. A half-width in a spectral sensitivity characteristic of the second photoelectric conversion element of each pair is wider than a half width in a spectral sensitivity characteristic of the first photoelectric conversion element of the pair. The imaging apparatus further includes a first signal generating unit generates a first luminance signal and a first color signal using an imaging signal outputted from the plurality of first photoelectric conversion elements and generate a second luminance signal and a second color signal using an imaging signal outputted from the plurality of second photoelectric conversion elements, a second signal generating unit that generates a third luminance signal for a recordation to a recording medium using at least one of the first luminance signal and the second luminance signal and generate a third color signal for a recordation to the recording medium using at least one of the first color signal and the second color signal, and a light-measuring unit that obtains the imaging signals outputted from each of the first photoelectric conversion elements and each of the second photoelectric conversion elements to perform photometry. The second signal generating unit changes a generating method of the third luminance signal and a generating method of the third color signal based on results of the photometry performed by the light-measuring unit.

The present invention also provides an imaging method using a solid-state imaging device that has a plurality of pairs of a first photoelectric conversion element and a second photoelectric conversion element, which have different spectral sensitivity characteristics, respectively. A wavelength range where the first photoelectric conversion element of each pair mainly has a spectral sensitivity and a wavelength range where the second photoelectric conversion element of the pair mainly has a spectral sensitivity fall within wavelength ranges of specific colors of visible light respectively. The plurality of pairs include a plurality of types of pairs having different specific colors. A half-width in a spectral sensitivity characteristic of the second photoelectric conversion element of each pair is wider than a half width in a spectral sensitivity characteristic of the first photoelectric conversion element of the pair. The imaging method includes a first signal generating step that generates a first luminance signal and a first color signal using an imaging signal outputted from the plurality of first photoelectric conversion elements and generates a second luminance signal and a second color signal using an imaging signal outputted from the plurality of second photoelectric conversion elements, a second signal generating step that generates a third luminance signal for a recordation to a recording medium using at least one of the first luminance signal and the second luminance signal and generates a third color signal for a recordation to the recording medium using at least one of the first color signal and the second color signal, and a light-measuring step that obtains the imaging signals outputted from each of the first photoelectric conversion elements and each of the second photoelectric conversion elements and performs photometry. The second signal generating step changes a generating method of the third luminance signal and a generating method of the third color signal based on results of the photometry performed in the light-measuring step.

Effects of the Invention

According to the present invention, an imaging apparatus and an imaging method which are capable of obtaining an image with optimal color reproducibility under a wide range of light intensity conditions may be provided.

DESCRIPTION OF THE PREFERRED EMBODIMENTS OF THE INVENTION

Hereinafter, exemplary embodiments of the present invention will be described with reference to the accompanying drawings.

Figure 1:
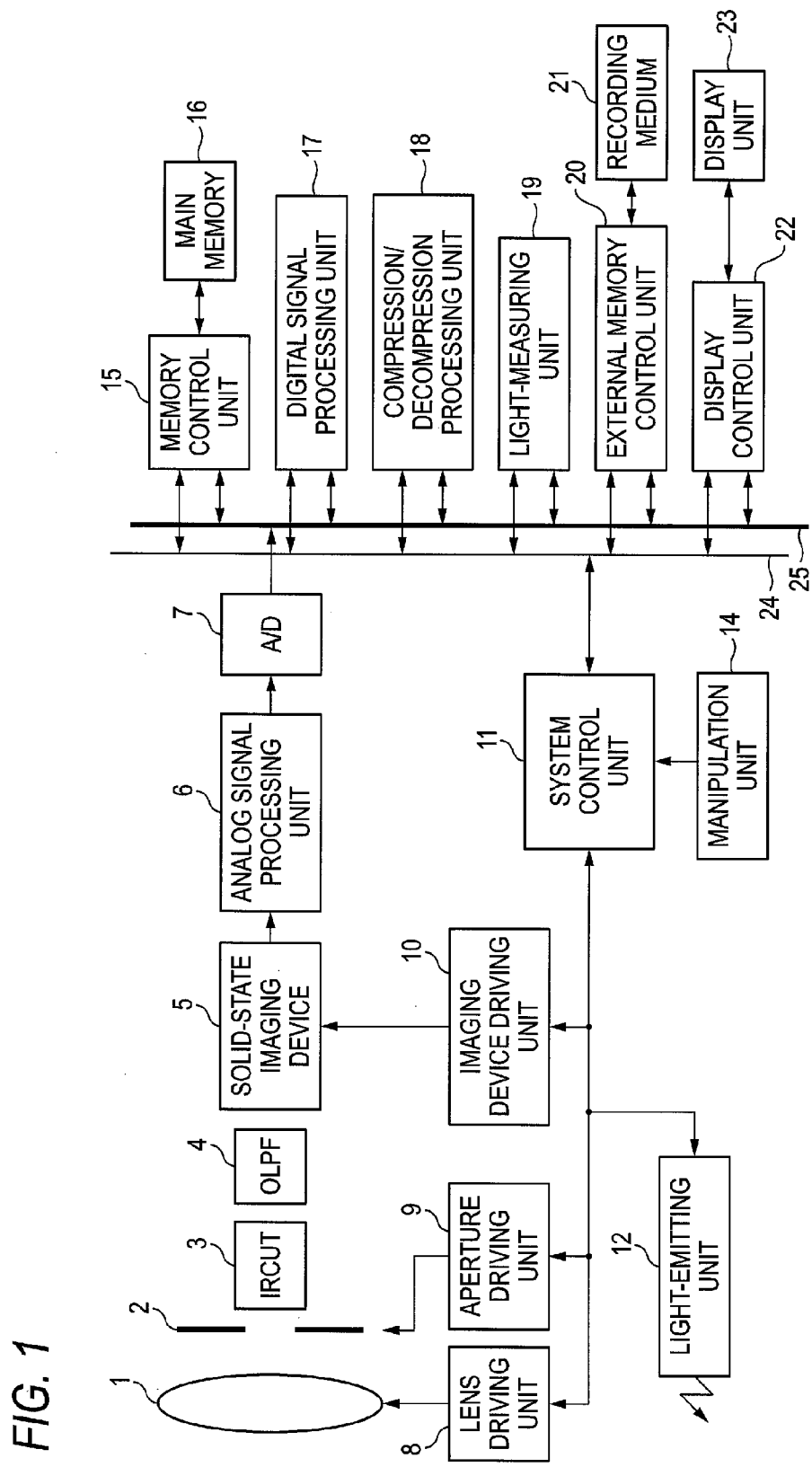
FIG. 1 is a view illustrating a schematic configuration of an imaging apparatus for describing an exemplary embodiment of the present invention.

FIG. 1 is a view illustrating a schematic configuration of an imaging apparatus for describing an exemplary embodiment of the present invention. As an imaging apparatus, there are an imaging apparatus such as, for example, a digital camera and a digital video camera, and an imaging module that is mounted on, for example, an electronic endoscope and a portable phone having a camera. Hereinafter, the digital camera is described as an example.

An imaging system of the illustrated digital camera includes a photographing lens 1, a CCD type solid-state imaging device 5, and a diaphragm 2, an infrared cut filter 3, and an optical low pass filter 4 which are installed between the photographing lens 1 and the solid-state imaging device 5. Further, a mechanical shutter (not illustrated) is also installed in front of the photographing lens 1.

A system control unit 11, which controls the entire electrical control system of the digital camera overall, controls a flash light-emitting unit 12. Further, the system control unit 11 controls a lens driving unit 8 either to adjust a position of the photographing lens 1 into a focus position or to perform a zoom adjustment. In addition, the system control unit 11 controls an aperture size of the diaphragm 2 via a diaphragm driving unit 9 to adjust an amount of exposure.

Further, the system control unit 11 drives the solid-state imaging device 5 via an imaging device driving unit 10, and outputs an image of a subject imaged through the photographing lens 1 as an imaging signal. The imaging device driving unit 10 also controls the opening/closing of the mechanical shutter. An instruction signal is inputted into the system control unit 11 from a user via a manipulation unit 14.

The electrical control system of the digital camera further includes: an analog signal processing unit 6 that is connected to an output of the solid-state imaging device 5 and performs an analog signal processing such as, for example, a correlated double sampling processing; and an analog/digital (A/D) conversion circuit 7 that converts the imaging signal outputted from the analog signal processing unit 6 into a digital signal. The analog signal processing unit 6 and the A/D conversion circuit 7 are controlled by the system control unit 11.

Furthermore, the electrical control system of the digital camera includes: a main memory 16; a memory control unit 15 connected to the main memory 16; a digital signal processing unit 17 that performs, for example, an interpolation operation, a gamma correction operation, a synchronization processing, and an RGB/YC conversion processing to generate an imaging image data; a compression/decompression processing unit 18 that compresses the imaging image data generated by the digital signal processing unit 17 into a Joint Photographic Experts Group (JPEG) format and decompresses the compressed image data; a light-measuring unit 19 that performs a light-measuring based on the imaging signal outputted from the solid-state imaging device 5; an external memory control unit 20 to which a detachable recording medium 21 is connected; and a display control unit 22 to which a liquid crystal display unit 23 mounted on, for instance, the rear side of the camera is connected.

The memory control unit 15, the digital signal processing unit 17, the compression/decompression processing unit 18, the light-measuring unit 19, the external memory control unit 20, and the display control unit 22 are mutually connected by a control bus 24 and a data bus 25, and are controlled by commands from the system control unit 11.

Figure 2:
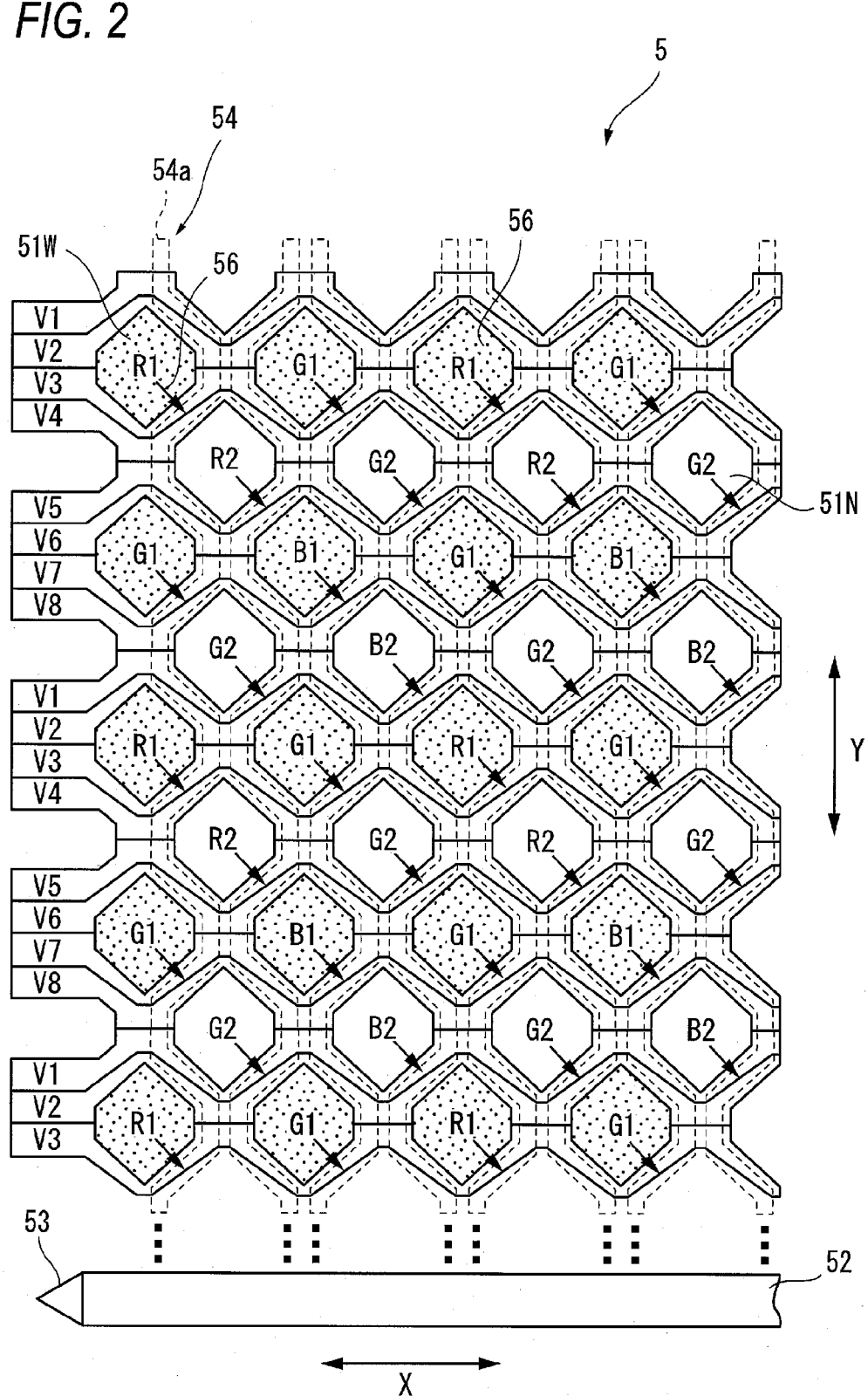
FIG. 2 is a plan view illustrating a schematic configuration of a solid-state imaging device in a digital camera illustrated in FIG. 1.

FIG. 2 is a plan view illustrating a schematic configuration of the solid-state imaging device 5 in the digital camera illustrated in FIG. 1.

As illustrated in FIG. 2, the solid-state imaging device 5 includes a first group made up of a plurality of photoelectric conversion elements 51W, a second group made up of a plurality of photoelectric conversion elements 51N, a plurality of vertical charge transfer units 54, a horizontal charge transfer unit 52, and an output unit 53.

All the photoelectric conversion elements included in the solid-state imaging device 5 are disposed in a two-dimensional shape in a column direction Y and a row direction X intersecting the column direction Y (crossing at right angle in the example of FIG. 2) on a semiconductor substrate surface. All the photoelectric conversion elements are constituted by first photoelectric conversion element lines made up of the plurality of photoelectric conversion elements 51W arranged in the column direction Y, and second photoelectric conversion element lines made up of the plurality of photoelectric conversion elements 51N arranged in the column direction Y. The first photoelectric conversion element lines and the second photoelectric conversion element lines are alternately arranged with a constant pitch in the row direction X. Furthermore, the first photoelectric conversion element lines are disposed to be shifted with respect to the second photoelectric conversion element lines in the column direction Y by a half of the array pitch of the photoelectric conversion elements of each photoelectric conversion element line in the column direction Y. This array may be obtained by disposing the photoelectric conversion elements 51N at positions offset in an inclined direction of 45° with respect to the respective photoelectric conversion elements 51W disposed in a square lattice shape.

As described above, the photoelectric conversion elements 51N are disposed next to the respective photoelectric conversion elements 51W in a predetermined direction. Each of the photoelectric conversion elements 51W and a photoelectric conversion element 51N adjacent to the photoelectric conversion element 51W in the predetermined direction form a pair of pixels.

All the photoelectric conversion elements included in the solid-state imaging device 5 have approximately the same configuration (the same configuration in design). The term "approximately the same configuration" refers that photoelectric conversion regions (photodiodes) formed within a semiconductor substrate have approximately the same size (the same in design), and that light-shielding films formed above the photoelectric conversion regions have approximately the same opening size (the same in design).

The first group made up of the photoelectric conversion elements 51W and the second group made up of the photoelectric conversion elements 51N are configured such that the exposure times of each of the first and second groups may be independently controlled.

In the solid-state imaging device 5, the photoelectric conversion elements 51W and the photoelectric conversion elements 51N forming pairs meet the following conditions.

(1) Spectral sensitivity characteristic of each of the photoelectric conversion elements 51W and spectral sensitivity characteristic of each of the photoelectric conversion elements 51N are different from each other.

(2) A wavelength range where the photoelectric conversion elements 51W mainly have spectral sensitivity and a wavelength range where the photoelectric conversion elements 51N mainly have spectral sensitivity (e.g., a half-width in the spectral sensitivity characteristic of the photoelectric conversion elements 51N) fall within wavelength ranges of lights of specific colors in visible light.

(3) The half width in the spectral sensitivity characteristic of the photoelectric conversion elements 51N is narrower than that in the spectral sensitivity characteristic of the photoelectric conversion elements 51W.

(4) A value of the spectral sensitivity at each wavelength of the wavelength range where the photoelectric conversion elements 51W mainly have the spectral sensitivity is greater than that at the corresponding wavelength of the photoelectric conversion elements 51N.

(5) A ratio of a peak value of the spectral sensitivity of the photoelectric conversion elements 51W to the half width in the spectral sensitivity characteristic of the photoelectric conversion elements 51W (half-width/peak value) is greater than a ratio of a peak value of the spectral sensitivity of the photoelectric conversion elements 51N to the half width in the spectral sensitivity characteristic of the photoelectric conversion elements 51N (half-width/peak value).

Meanwhile, a wavelength range where a photoelectric conversion element mainly has spectral sensitivity refers that most of the signals outputted from the photoelectric conversion element are a signal according to light in the wavelength range, and refers a range where a signal component according to light other than the wavelength range hardly affects the color of the signal outputted from the photoelectric conversion element. Hereinafter, a half width in the spectral sensitivity characteristic of each photoelectric conversion element will be described as a wavelength range where the photoelectric conversion element mainly has the spectral sensitivity.

As a method of differentiating the spectral sensitivity characteristics in a photoelectric conversion element 51W and a photoelectric conversion element 51N forming a pair, several methods may be employed. In the solid-state imaging device 5, a method in which the spectral sensitivity characteristics of the color filters provided above each of the photoelectric conversion element 51W and the photoelectric conversion element 51N forming a pair are different from each other, is employed.

A color filter R1 in which a red light penetrates, a color filter G1 in which a green light penetrates, and a color filter B1 in which a blue light penetrates, which are disposed in a Bayer pattern as a whole, are installed above each of the photoelectric conversion elements 51W.

In FIG. 2, the letter "R1" is given to the photoelectric conversion elements 51W above which the color filters R1 are installed. Further, the letter "G1" is given to the photoelectric conversion elements 51W above which the color filters G1 are installed. Further, the letter "B1" is given to the photoelectric conversion elements 51W above which the color filters B1 are installed.

A color filter R2 in which a red light penetrates, a color filter G2 in which a green light penetrates, and a color filter B2 in which a blue light penetrates, which are disposed in a Bayer pattern as a whole, are installed above each of the photoelectric conversion elements 51N.

In FIG. 2, the letter "R2" is given to the photoelectric conversion elements 51N above which the color filters R2 are installed. Further, the letter "G2" is given to the photoelectric conversion elements 51N above which the color filters G2 are installed. Further, the letter "B2" is given to the photoelectric conversion elements 51N above which the color filters B2 are installed.

Hereinafter, the color filter R1 and the color filter R2 are collectively referred to as a red filter. Further, the color filter G1 and the color filter G2 are collectively referred to as a green filter. Further, the color filter B1 and the color filter B2 are collectively referred to as a blue filter.

In this way, the same color filters (the red filters, the green filters, or the blue filters) are disposed above the respective photoelectric conversion elements 51W and the respective photoelectric conversion elements 51N that form pairs. Accordingly, three types of pairs that are different in the color of the filter installed on the upper side (R pairs having the red filters thereabove, G pairs having the green filters thereabove, and B pairs having the blue filters thereabove) are included in the solid-state imaging device 5.

Meanwhile, the specific color in the above condition (2) for each of the photoelectric conversion elements of the R pairs is red. The specific color in the above condition (2) for each of the photoelectric conversion elements of the G pairs is green. The specific color in the above condition (2) for each of the photoelectric conversion elements of the B pairs is blue.

In the respective photoelectric conversion elements of the R pairs, the respective spectral sensitivity characteristics of the color filters R1 and the color filters R2 are differentiated, and thus, a difference is provided in spectral sensitivity characteristic between the photoelectric conversion elements 51W and the photoelectric conversion elements 51N.

In the respective photoelectric conversion elements of the G pairs, the respective spectral sensitivity characteristics of the color filters G1 and the color filters G2 are differentiated, and thus, a difference is provided in spectral sensitivity characteristic between the photoelectric conversion elements 51W and the photoelectric conversion elements 51N.

In the respective photoelectric conversion elements of the B pairs, the respective spectral sensitivity characteristics of the color filters B1 and the color filters B2 are differentiated, and thus, a difference is provided in spectral sensitivity characteristic between the photoelectric conversion elements 51W and the photoelectric conversion elements 51N.

Hereinafter, specific examples of the spectral sensitivity characteristic of each of the photoelectric conversion elements of the R pairs, each of the photoelectric conversion elements of the G pairs, and each of the photoelectric conversion elements of the B pairs, will be described.

Figure 3:
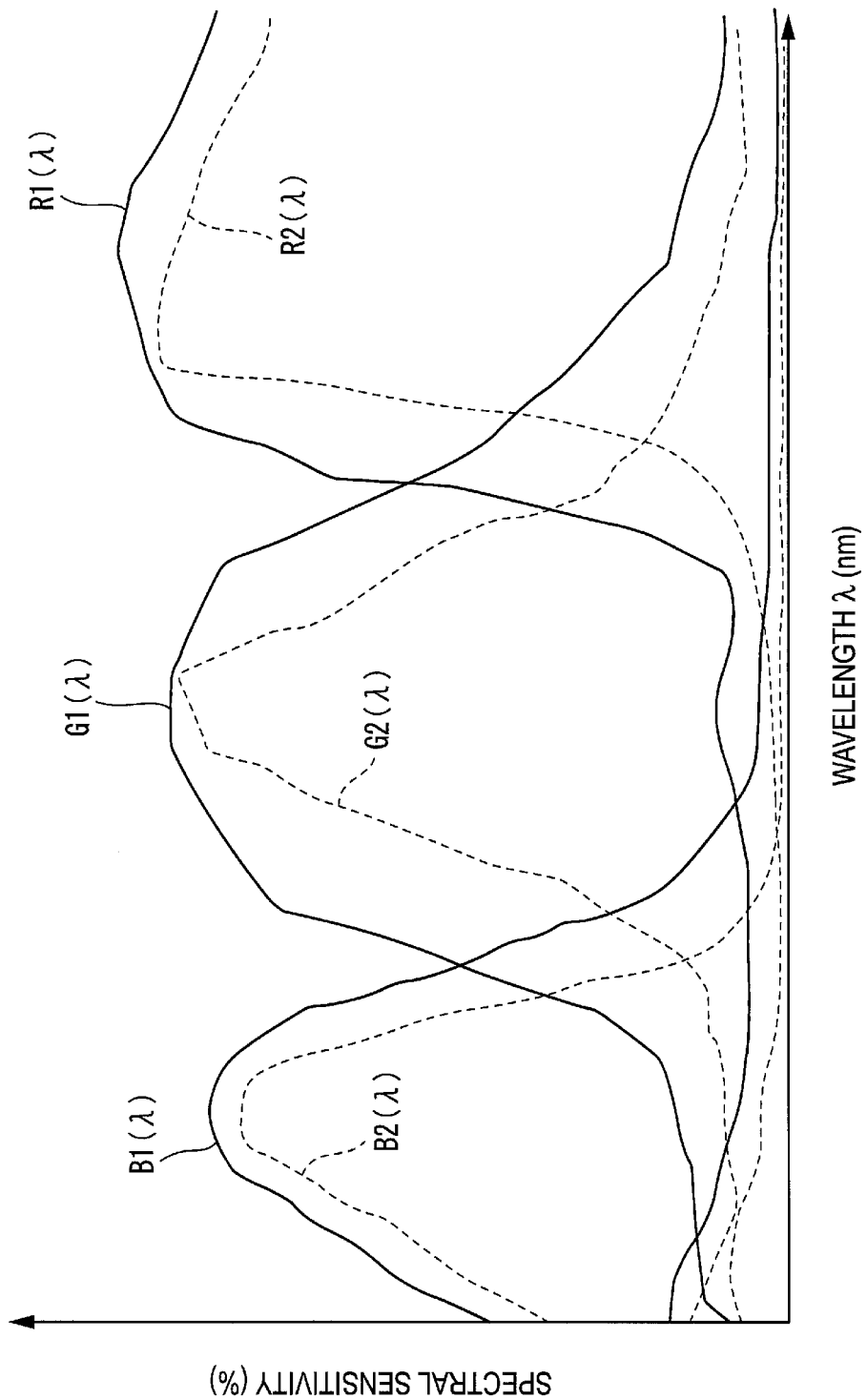
FIG. 3 is a diagram illustrating spectral sensitivity characteristics of photoelectric conversion elements 51W and photoelectric conversion elements 51N in the solid-state imaging device illustrated in FIG. 2.

FIG. 3 is a diagram illustrating an example of the spectral sensitivity characteristics of the photoelectric conversion elements 51W and the photoelectric conversion elements 51N in the solid-state imaging device 5 illustrated in FIG. 2. In FIG. 3, the characteristics indicated by symbols $R1(\lambda)$, $G1(\lambda)$, and $B1(\lambda)$ exhibit the spectral sensitivity characteristics of the photoelectric conversion elements 51W which are provided with the color filters R1, G1, and B1, respectively. Further, the characteristics indicated by symbols $R2(\lambda)$, $G2(\lambda)$, and $B2(\lambda)$ exhibit the spectral sensitivity characteristics of the photoelectric conversion elements 51N on which the color filters R2, G2, and B2 are installed, respectively.

In the example illustrated in FIG. 3, the spectral sensitivity value at each wavelength of the wavelength range (half width) where the photoelectric conversion elements 51W of the R pairs mainly have the spectral sensitivity is greater than that of each corresponding wavelength of the photoelectric conversion elements 51N of the R pairs. Further, the half width in the spectral sensitivity characteristic $R2(\lambda)$ is narrower than that in the spectral sensitivity characteristic $R1(\lambda)$, and is located inside $R1(\lambda)$. Furthermore, the half width in the spectral sensitivity characteristic $R1(\lambda)$ falls within the wavelength range of red. A ratio of the peak value to the half width of the spectral sensitivity characteristic $R1(\lambda)$ becomes greater than a ratio of the peak value to the half width of the spectral sensitivity characteristic $R2(\lambda)$. The half width in each of the spectral sensitivity characteristics $R1(\lambda)$ and $R2(\lambda)$ is set as a value in the wavelength range of the visible light.

In the example illustrated in FIG. 3, the spectral sensitivity value at each wavelength of the wavelength range (half width) where the photoelectric conversion elements 51W of the G pairs mainly have the spectral sensitivity is greater than that of each corresponding wavelength of the photoelectric conversion elements 51N of the G pairs. Further, the half width in the spectral sensitivity characteristic $G2(\lambda)$ is narrower than that in the spectral sensitivity characteristic $G1(\lambda)$, and is located inside $G1(\lambda)$. Further, the half width in the spectral sensitivity characteristic $G1(\lambda)$ falls within the wavelength range of green. A ratio of the peak value to the half width of the spectral sensitivity characteristic $G1(\lambda)$ becomes greater than a ratio of the peak value to the half width of the spectral sensitivity characteristic $G2(\lambda)$.

In the example illustrated in FIG. 3, the spectral sensitivity value at each wavelength of the wavelength range (half width) where the photoelectric conversion elements 51W of the B pairs mainly have the spectral sensitivity is greater than that of each corresponding wavelength of the photoelectric conversion elements 51N of the B pairs. Further, the half width in the spectral sensitivity characteristic $B2(\lambda)$ is narrower than that in the spectral sensitivity characteristic $B1(\lambda)$, and is located inside $B1(\lambda)$. Furthermore, the half width in the spectral sensitivity characteristic $B1(\lambda)$ falls within the wavelength range of blue. A ratio of the peak value to the half width of the spectral sensitivity characteristic $B1(\lambda)$ becomes greater than a ratio of the peak value to the half width of the spectral sensitivity characteristic $B2(\lambda)$. The half width in each of the spectral sensitivity characteristics $B1(\lambda)$ and $B2(\lambda)$ is set as a value in the wavelength range of the visible light.

The above conditions (1) to (5) can be met by providing the spectral sensitivity characteristics illustrated in FIG. 3 in this way.

The photoelectric conversion element 51W in a pair has a wide spectral sensitivity characteristic, of which the half width is wider than that of photoelectric conversion element 51N in the pair. For this reason, a first group of photoelectric conversion elements 51W may be, hereinafter, referred to as a wide element group. Further, an imaging image signal, which is a set of the imaging signals outputted from each of the photoelectric conversion elements 51W of the wide element group, may be, hereinafter, referred to as a wide signal.

Further, the photoelectric conversion element 51N in a pair has a narrow spectral sensitivity characteristic, of which the half width is narrower than that of photoelectric conversion element 51W in the pair. For this reason, a second group of photoelectric conversion elements 51N may be, hereinafter, referred to as a narrow element group. Further, an imaging image signal, which is a set of the imaging signals outputted from each of the photoelectric conversion elements 51N of the narrow element group, may be, hereinafter, referred to as a narrow signal.

The spectral characteristics of the first group of photoelectric conversion elements 51W have a wider spectrum than the second group of photoelectric conversion elements 51N. As a result, there is an advantage in which stable color reproducibility may be obtained without depending on a light source. Further, this spectral characteristic has an advantage in that high sensitivity and low noise may be realized, because the light absorption amount is large.

In contrast to this, the spectral characteristics of the second group of photoelectric conversion elements 51N have a narrower spectrum than the first group of photoelectric conversion elements 51W. As a result, there is an advantage in which an image with high chroma may be obtained. Further, this spectral characteristic has an advantage in that color discrimination may be good and a color reproducing area may be wide, because the light absorption amount is small.

Referring to FIG. 2 again, the plurality of vertical charge transfer paths 54 are installed corresponding to each of the photoelectric conversion element lines one by one. Each vertical charge transfer path 54 transfers charges read-out from each photoelectric conversion element of the corresponding photoelectric conversion element line to the column direction Y.

Each of the vertical charge transfer units 54 is constituted by a charge transfer channel 54a formed within the semiconductor substrate and transfer electrodes V1 to V8 which are arranged in the column direction Y thereabove. The transfer electrodes V1 to V8 are configured such that a driving pulse is supplied to the electrodes from the imaging device driving unit 10. The vertical charge transfer units 54 are driven by the driving pulse.

A charge read-out region 56 (which is schematically depicted by an arrow in FIG. 2) is formed between each of the charge transfer channels 54a and each of the photoelectric conversion elements of the photoelectric conversion element line corresponding to the charge read-out region 56.

The transfer electrodes V3 cover the charge read-out regions 56 of the photoelectric conversion elements 51W of the first group of photoelectric conversion elements 51W which are in the odd-number rows from an end (a top end) opposite to a side where the horizontal charge transfer unit 52 of the solid-state imaging device 5 is installed. That is, the transfer electrodes V3 also serve as a read-out electrode that reads out the charge from the photoelectric conversion elements 51W in the odd-number rows.

The transfer electrodes V7 cover the charge read-out regions 56 of the photoelectric conversion elements 51W of the first group of photoelectric conversion elements 51W which are in the even-number rows from the top end of the solid-state imaging device 5. That is, the transfer electrodes V7 also serve as a read-out electrode that reads out the charge from the photoelectric conversion elements 51W in the even-number rows.

The transfer electrodes V5 cover the charge read-out regions 56 of the photoelectric conversion elements 52N of the second group of photoelectric conversion elements 52N which are in the odd-number rows from the top end of the solid-state imaging device 5. That is, the transfer electrodes V5 also serve as a read-out electrode that reads out the charge from the photoelectric conversion elements 52N in the odd-number rows.

The transfer electrodes V1 cover the charge read-out regions 56 of the photoelectric conversion elements 52N of the second group of photoelectric conversion elements 52N which are in the even-number rows from the top end of the solid-state imaging device 5. That is, the transfer electrodes V1 also serve as a read-out electrode that reads out the charge from the photoelectric conversion elements 52N in the even-number rows.

The horizontal charge transfer unit 52 transfers the charges, which are transferred from the plurality of vertical charge transfer units 54, to the row direction X.

The output unit 53 converts the charges, which are transferred from the horizontal charge transfer unit 52, into a signal corresponding to the amount of the charges, and outputs the signal.

Referring to FIG. 1 again, the light-measuring unit 19 calculates a light-measuring value (a wide light-measuring value) using the wide signal outputted from the wide element group. Further, the light-measuring unit 19 calculates a light-measuring value (a narrow light-measuring value) using the narrow signal outputted from the narrow element group.

The system control unit 11 has an automatic exposure (AE) function where a proper exposure value is determined based on the narrow light-measuring value or the wide light-measuring value.

Next, the detailed configuration of the digital signal processing unit 17 in the digital camera illustrated in FIG. 1 will be described.

Figure 4:
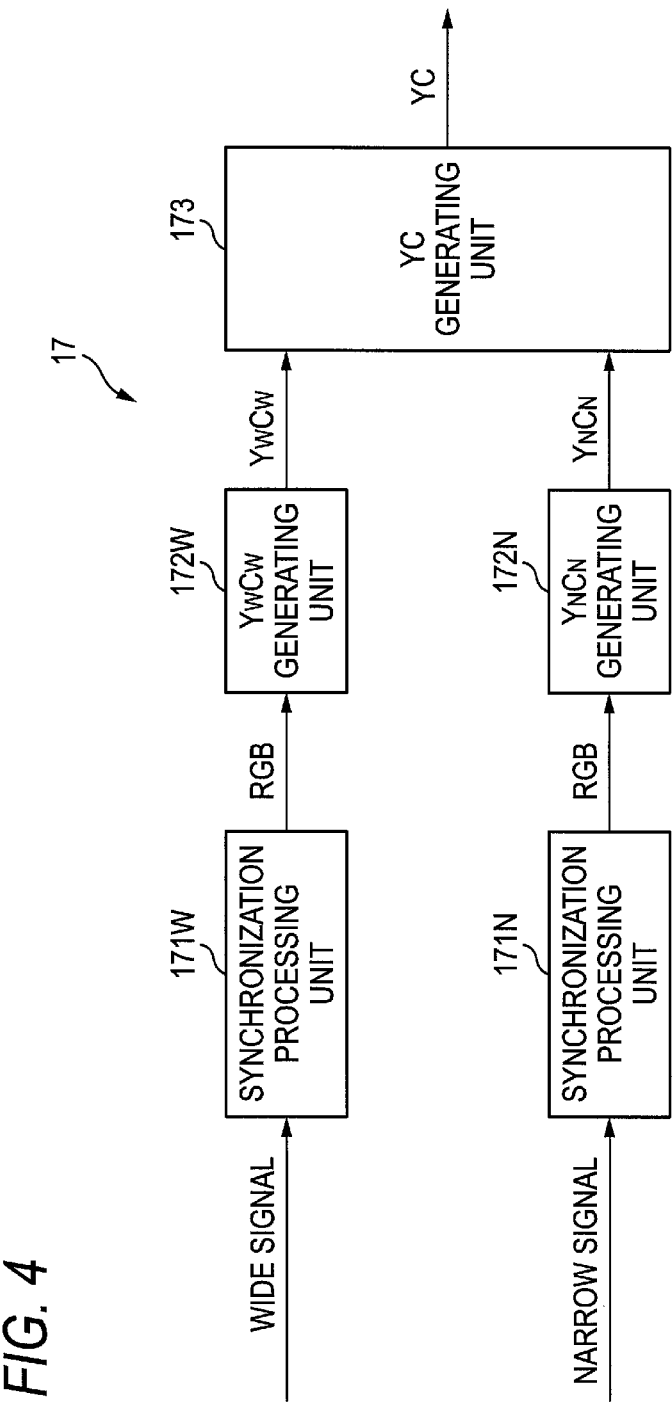
FIG. 4 is a view illustrating an internal configuration of a digital signal processing unit in the digital camera illustrated in FIG. 1.

FIG. 4 is a view illustrating an internal configuration of the digital signal processing unit in the digital camera illustrated in FIG. 1. As illustrated in FIG. 4, the digital signal processing unit 17 includes synchronization processing units 171W, 171N, luminance•chrominance signal generating units 172W, 172N, and a luminance•chrominance signal generating unit 173.

The synchronization processing unit 171W performs a synchronization processing to the wide signal outputted from the wide element group and stored in the main memory 16, and generates a wide imaging image data.

The synchronization processing refers a processing that interpolates the imaging signal of a color component other than the color component of the imaging signal using a neighboring imaging signal, in the memory position of each imaging signal constituting imaging image signal. By the processing, an imaging pixel signal is generated which is constituted by the imaging signals made up of three color components of red (R), green (G), and blue (B), in the memory position corresponding to each photoelectric conversion element 51W of the wide element group. A wide imaging image data is generated by the set of the imaging pixel signals.

The synchronization processing unit 171N performs a synchronization processing to the narrow signal outputted from the narrow element group and stored in the main memory 16, and generates a narrow imaging image data. By the synchronization processing, an imaging pixel signal is generated which is constituted by the imaging signals made up of three color components of red (R), green (G), and blue (B), in the memory position corresponding to each photoelectric conversion element 51N of the narrow element group. A narrow imaging image data is generated by the set of the imaging pixel signals.

The luminance•chrominance signal generating unit 172W generates a luminance signal $Y_W$ and chrominance signals $Cr_W$, $Cb_W$, which are color signals, by a known operation using each imaging pixel signal of the wide imaging image data generated at the synchronization processing unit 171W.

The luminance•chrominance signal generating unit 172N generates a luminance signal $Y_N$ and chrominance signals $Cr_N$, $Cb_N$, which are color signals, by a known operation using each imaging pixel signal of the narrow imaging image data generated at the synchronization processing unit 171N.

The luminance•chrominance signal generating unit 173 generates a luminance signal Y, which is a luminance signal for a recording to the recording medium 21, using at least one of the luminance signal $Y_W$ and the luminance signal $Y_N$. The luminance•chrominance signal generating unit 173 generates a chrominance signal Cr, which is a color signal for a recording to the recording medium 21, using at least one of the chrominance signal $Cr_W$ and the chrominance signal $Cr_N$. The luminance•chrominance signal generating unit 173 generates a chrominance signal Cb, which is a color signal for a recording to the recording medium 21, using at least one of the chrominance signal $Cb_W$ and the chrominance signal $Cb_N$.

The imaging image data constituted by the luminance signal Y and the chrominance signals Cr, Cb which are generated at the luminance•chrominance signal generating unit 173 is compressed at the compression/decompression processing unit 18 and then is recorded to the recording medium 21.

The characteristic of the digital camera is that the luminance•chrominance signal generating unit 173 changes the generating method of the luminance signal Y and the chrominance signals Cr, Cb according to the light-measuring result by the light-measuring unit 19.

Specifically, the luminance•chrominance signal generating unit 173 generates the luminance signal Y and the chrominance signals Cr, Cb based on the following Equations 1 to 3.

$$Y = \epsilon_1 Y_N + \epsilon_2 Y_W \quad (1)$$

$$Cr = \alpha_1 Cr_N + \alpha_2 Cr_W \quad (2)$$

$$Cb = \alpha_1 Cb_N + \alpha_2 Cb_W \quad (3)$$

where, $\epsilon_1$, $\epsilon_2$, $\alpha_1$, $\alpha_2$ each is a coefficient.

Hereinafter, the generating processing of the luminance signal Y and the chrominance signals Cr, Cb by the luminance•chrominance signal generating unit 173 will be described in detail.

When the narrow light-measuring value is equal to or more than the threshold value Th1 which is a proper exposure value determined based on the narrow light-measuring value, the proper exposure may be obtained in the narrow element group (the exposure amount at the narrow element group is fully satisfied). In this case, the luminance•chrominance signal generating unit 173 generates the luminance signal Y and the chrominance signals Cr, Cr based on $\epsilon_1=1$, $\epsilon_2=0$, $0<\alpha_1\leq 1$, $\alpha_2=(1-\alpha_1)$.

Specifically, the luminance•chrominance signal generating unit 173 selects and performs one of the following a first processing and a second processing according to the narrow signal which is used when the narrow light-measuring value is obtained.

The first processing is a processing that generates a luminance signal Y and chrominance signals Cr, Cb when the luminance signal $Y_N$ as it is becomes a luminance signal Y, adding the chrominance signal $Cr_N$ and the chrominance signal $Cr_W$ in a predetermined ratio becomes a chrominance signal Cr, and the chrominance signal $Cb_N$ and the chrominance signal $Cb_W$ in the predetermined ratio becomes a chrominance signal Cb. The first processing corresponds to a processing that is operated when $\epsilon_1=1$, $\epsilon_2=0$ in Equation 1, and $\alpha_1$ becomes $0<\alpha_1<1$, $\alpha_2$ becomes $(1-\alpha_1)$ in Equations 2 and 3.

The second processing is a processing that generates a luminance signal Y and chrominance signals Cr, Cb when the luminance signal $Y_N$ as it is becomes a luminance signal Y, the chrominance signal $Cr_N$ as it is becomes a chrominance signal Cr, and the chrominance signal $Cb_N$ as it is becomes a chrominance signal Cb. The second processing corresponds to a processing that is operated when $\epsilon_1=1$, $\epsilon_2=0$ in Equation 1, and $\alpha_1=1$, $\alpha_2=0$ in Equations 2 and 3.

Even though the narrow light-measuring value is equal to or more than the threshold value Th1, in a case where a ratio that the imaging pixel signal which is color saturated occupies becomes large in the narrow imaging image data generated by the synchronization processing from the narrow signal that is used when the narrow light-measuring value is obtained, the color saturated imaging image data may be obtained when the second processing is performed.

Therefore, the luminance•chrominance signal generating unit 173 performs the first processing when the ratio of the color saturated imaging pixel signal of the narrow imaging image data based the narrow signal that is used when the narrow light-measuring value is obtained is equal to or more than a threshold value. Further, luminance•chrominance signal generating unit 173 performs the second processing when the ratio of the color saturated imaging pixel signal becomes less than the threshold value. That is, the luminance•chrominance signal generating unit 173 selects and performs one of the first processing and the second processing according to the color saturated degree of the narrow imaging image data based on the narrow signal which is used when the narrow light-measuring value is obtained.

As a result, even when the most of the narrow imaging image data are color saturated, the color saturation is prevented by performing the first processing to change the dynamic range of the chrominance signals Cr, Cb (change the chroma), thereby improving the color reproducibility. Meanwhile, the value of a at this time may be set to a value capable of preventing the color saturation.

Further, when the narrow light-measuring value is less than the threshold value Th1 and the wide light-measuring value is equal to or more than a threshold value Th2 which is a proper exposure value determined based on the narrow light-measuring value, the proper exposure is not obtained in the narrow element group, but the proper exposure may be obtained in the wide element group (the exposure amount is fully satisfied in the wide element group). For that reason, the luminance•chrominance signal generating unit 173 generates the luminance signal Y and the chrominance signals Cr, Cr based on $\epsilon_1=0$, $\epsilon_2=1$, $0\leq\alpha_1<1$, $\alpha_2=(1-\alpha_1)$.

Specifically, the luminance-chrominance signal generating unit 173 selects and performs one of the following a third processing and a fourth processing according to the wide signal that is used when the wide light-measuring value is obtained.

The third processing is a processing that generates a luminance signal Y and chrominance signals Cr, Cb when the luminance signal $Y_W$ as it is becomes a luminance signal Y, adding the chrominance signal $Cr_N$ and the chrominance signal $Cr_W$ in a predetermined ratio becomes a chrominance signal Cr, and the chrominance signal $Cb_N$ and the chrominance signal $Cb_W$ in the predetermined ratio becomes a chrominance signal Cb. The third processing corresponds to a processing that is operated when $\epsilon_1=0$, $\epsilon_2=1$ in Equation 1, and $\alpha_1$ becomes $0<\alpha_1<1$, $\alpha_2$ becomes $(1-\alpha_1)$ in Equations 2 and 3.

The fourth processing is a processing that generates a luminance signal Y and chrominance signals Cr, Cb when the luminance signal $Y_W$ as it is becomes a luminance signal Y, the chrominance signal $Cr_W$ as it is becomes a chrominance signal Cr, and the chrominance signal $Cb_W$ as it is becomes a chrominance signal Cb. The fourth processing corresponds to a processing that is operated when $\epsilon_1=0$, $\epsilon_2=1$ in Equation 1, and $\alpha_1=0$, $\alpha_2=1$ in Equations 2 and 3.

Even though the wide light-measuring value is equal to or more than the threshold value Th2, in a case where a ratio that the imaging pixel signal which is color saturated occupies becomes large in the wide imaging image data generated by the synchronization processing from the wide signal that is used when the wide light-measuring value is obtained, the color saturated imaging image data may be obtained when the fourth processing is performed.

Therefore, the luminance chrominance signal generating unit 173 performs the third processing when the ratio of the color saturated imaging pixel signal of the wide imaging image data based the wide signal that is used when the wide light-measuring value is obtained is equal to or more than a threshold value. Further, luminance•chrominance signal generating unit 173 performs the fourth processing when the ratio of the color saturated imaging pixel signal becomes less than the threshold value. That is, the luminance•chrominance signal generating unit 173 selects and performs one of the third processing and the fourth processing according to the color saturated degree of the wide imaging image data based on the wide signal which is used when the wide light-measuring value is obtained.

As a result, even when the most of the wide imaging image data are color saturated, the color saturation is prevented by performing the third processing to change the dynamic range of the chrominance signals Cr, Cb (change the chroma), thereby improving the color reproducibility. Meanwhile, the value of a at this time may be set to a value capable of preventing the color saturation.

Further, when the wide light-measuring value is less than the threshold value Th2, this case means a dark scene where none of the narrow element group and the wide element group obtains the proper exposure. For that reason, the luminance•chrominance signal generating unit 173 generates the luminance signal Y and the chrominance signals Cr, Cb based on $0<\epsilon_1 \le 1$, $0<\epsilon_2 \le 1$, $0<\alpha_1 \le 1$, $0<\alpha_2 \le 1$.

Specifically, the luminance•chrominance signal generating unit 173 selects and performs one of the following a fifth processing, a sixth processing and a seventh processing according to the subject scene.

The fifth processing is a processing that generates a luminance signal Y and chrominance signals Cr, Cb when adding the luminance signal $Y_W$ and the luminance signal $Y_N$ in a predetermined ratio becomes a luminance signal Y, adding the chrominance signal $Cr_N$ and the chrominance signal $Cr_W$ in a ratio where the ratio of the chrominance signal $Cr_N$ is more than the chrominance signal $Cr_W$ becomes a chrominance signal Cr, and adding the chrominance signal $Cb_N$ and the chrominance signal $Cb_W$ in a ratio where the ratio of the chrominance signal $Cb_N$ is more than the chrominance signal $Cb_W$ becomes a chrominance signal Cb. The fifth processing corresponds to a processing that is operated when $0<\epsilon_1<1$, $0<\epsilon_2<1$ in Equation 1, and $0<\alpha_1<1$, $0<\alpha_2<1$, $\alpha_2<\alpha_1$ in Equations 2 and 3.

The sixth processing is a processing that generates a luminance signal Y and chrominance signals Cr, Cb when adding the luminance signal $Y_W$ and the luminance signal $Y_N$ in a predetermined ratio becomes a luminance signal Y, adding the chrominance signal $Cr_N$ and the chrominance signal $Cr_W$ in a ratio where the ratio of the chrominance signal $Cr_W$ is more than the chrominance signal $Cr_N$ becomes a chrominance signal Cr, and adding the chrominance signal $Cb_N$ and the chrominance signal $Cb_W$ in a ratio where the ratio of the chrominance signal $Cb_W$ is more than the chrominance signal $Cb_N$ becomes a chrominance signal Cb. The sixth processing corresponds to a processing that is operated when $0<\epsilon_1<1$, $0<\epsilon_2<1$ in Equation 1, and $0<\alpha_1<1$, $0<\alpha_2<1$, $\alpha_2>\alpha_1$ in Equations 2 and 3.

The seventh processing is a processing that generates a luminance signal Y and chrominance signals Cr, Cb when simply adding the luminance signal $Y_N$ and the luminance signal $Y_W$ becomes a luminance signal Y, simply adding the chrominance signal $Cr_N$ and the chrominance signal $Cr_W$ becomes a chrominance signal Cr, and simply adding the chrominance signal $Cb_N$ and the chrominance signal $Cb_W$ becomes a chrominance signal Cb. The seventh processing corresponds to a processing that is operated when $\epsilon_1=1$, $\epsilon_2=1$ in Equation 1, and $\alpha_1=\alpha_2=1$ in Equations 2 and 3.

In the fifth processing, the ratios of the chrominance signals $Cr_N$, $Cb_N$ included in the chrominance signals Cr, Cb are large, and thus, the chroma of the imaging image data that is finally generated is raised. As a result, it is an appropriate processing to represent a subject of which color is clear.

In the sixth processing, the ratios of the chrominance signals $Cr_W$, $Cb_W$ included in the chrominance signals Cr, Cb are large, and thus, the chroma of the imaging image data that is finally generated is decreased. As a result, it is an appropriate processing to represent a subject of which color is not clear, for example, a skin color.

In the seventh processing, the ratios of the chrominance signals $Cr_W$, $Cb_W$ and the chrominance signals $Cr_N$, $Cb_N$ included in the chrominance signals Cr, Cb are the same. As a result, the chroma is rarely changed, but the sensitivity may be raised along with the luminance signal Y and the chrominance signals Cr, Cb. Therefore, it is an appropriate processing to a dark scene, for example, a nightscape.

The fifth processing to the seventh processing have the above-described characteristics. As a result, the luminance•chrominance signal generating unit 173 performs the seventh processing when the subject scene is a subject scene that puts the sensitivity first (a scene including, for example, a nightscape). Further, the luminance•chrominance signal generating unit 173 performs the fifth processing or the sixth processing when the subject scene is a subject scene that puts the color reproducibility first (a scene including, for example, a portrait or a landscape). By doing so, the optimal image quality may be obtained according to the subject scene.

Meanwhile, the ratios of the luminance signal $Y_W$ and the luminance signal $Y_N$ when adding the luminance signal $Y_W$ and the luminance signal $Y_N$ in the fifth processing and the sixth processing, may be set such that the luminance signal Y is equal to or more than a signal level corresponding to an exposure amount based on the proper exposure value Th2.

Hereinafter, the operations of the digital camera illustrated in FIG. 1 at an imaging mode, will be described.

Figure 5:
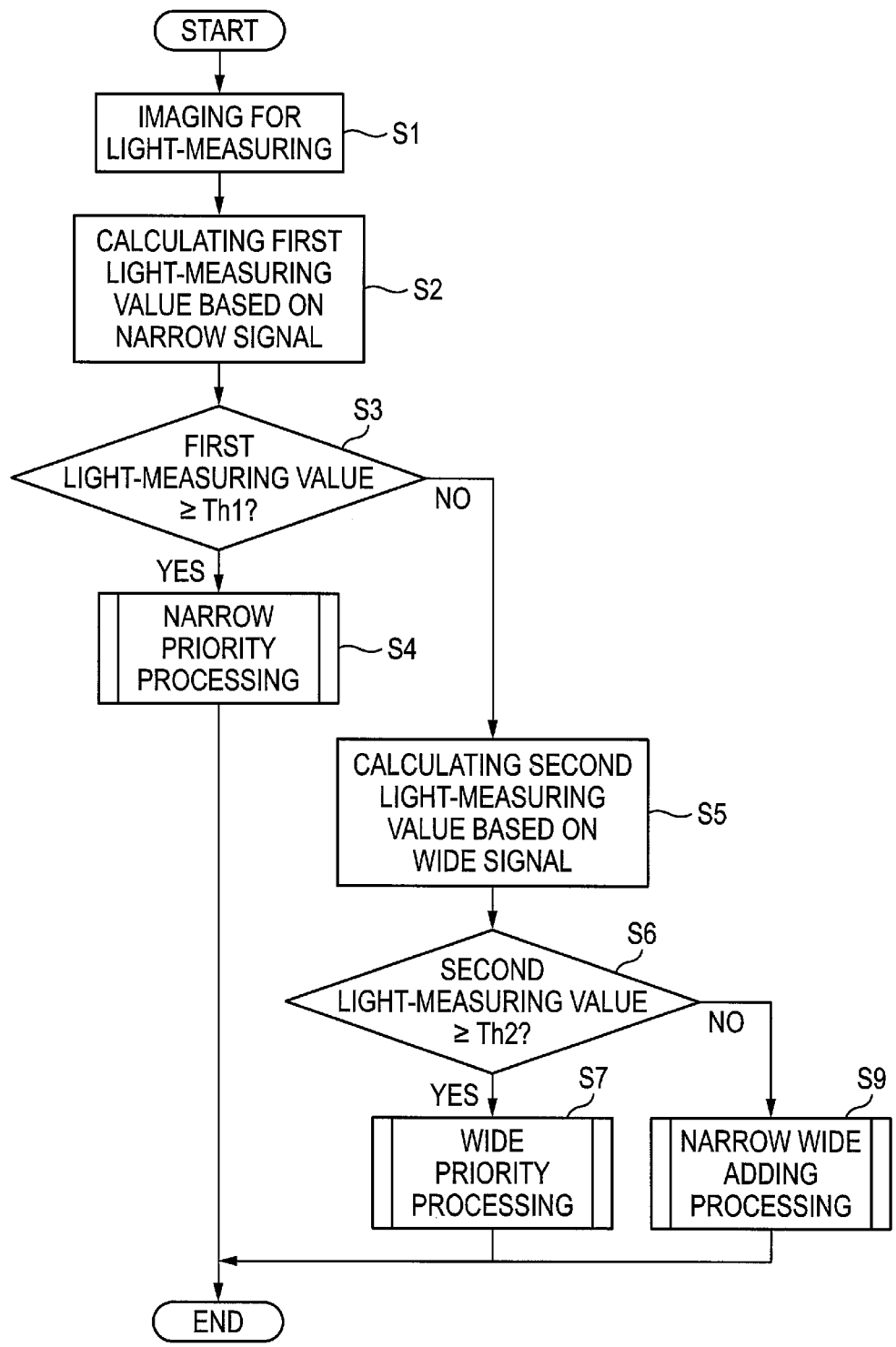
FIG. 5 is a flow chart illustrating the operations of the digital camera illustrated in FIG. 1 at an imaging mode.

FIG. 5 is a flow chart illustrating the operations of the digital camera illustrated in FIG. 1 at the imaging mode.

When a shutter button included in the manipulation unit 14 is pushed halfway, the system control unit 11 performs a preparatory imaging for carrying out the automatic exposure control (AE) and the automatic focusing control (AF) by means of the solid-state imaging device 5 (step S1). The system control unit 11 performs the preparatory imaging in a state where the exposure times of the narrow element group and the wide element group are the same.

Next, the light-measuring unit 19 obtains the narrow signal obtained from the solid-state imaging device 5 at the preparatory imaging and calculates a first light-measuring value based on the narrow signal (step S2).

Next, the system control unit 11 decides a proper exposure value (threshold value Th1) based on the first light-measuring value and determines whether the first light-measuring value is equal to or more than the threshold value Th1 (step S3).

When the first light-measuring value is equal to or more than the threshold value Th1 (at step S3: YES), the narrow priority processing is performed (step S4).

When the second light-measuring value is less than the threshold value Th1 (at step S3: NO), the light-measuring unit 19 obtains the wide signal obtained from the solid-state imaging device 5 at the preparatory imaging and calculates a second light-measuring value based on the wide signal (step S5).

Next, the system control unit 11 decides a proper exposure value (threshold value Th2) based on the second light-measuring value and determines whether the second light-measuring value is equal to or more than the threshold value Th2 (step S6).

When the second light-measuring value is equal to or more than the threshold value Th2 (at step S6: YES), the wide priority processing is performed (step S7).

When the second light-measuring value is less than the threshold value Th2 (at step S6: NO), the narrow wide adding processing is performed (step S9).

Next, the detailed descriptions of the narrow priority processing, the wide priority processing, and the narrow wide adding processing will be described.

Figure 6:
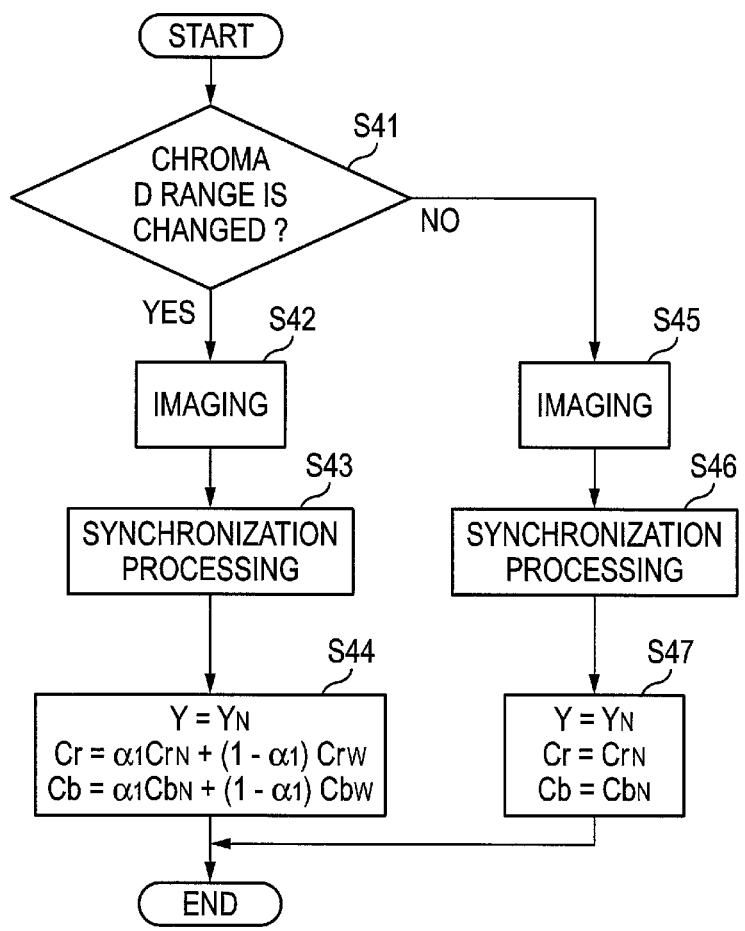
FIG. 6 is a flow chart illustrating the detailed description of a narrow priority processing (step S4) in the flow chart illustrated in FIG. 5.

FIG. 6 is a flow chart illustrating the content of step S4 in the flow chart illustrated in FIG. 5.

When the narrow priority processing is initiated, the system control unit 11 determines whether the chroma dynamic range (the dynamic range of the chrominance signals Cr, Cb) is changed based on the narrow signal obtained at the preparatory imaging (step S41).

Specifically, the system control unit 11 synchronizes the narrow signal, which is obtained at the preparatory imaging, in the digital signal processing unit 17 to generate a narrow imaging image data. The system control unit 11 calculates a ratio where the color saturated imaging pixel signal of the narrow imaging image data occupies over the entire narrow imaging image data. The system control unit 11 determines that the chroma dynamic range is to be changed when the ratio is equal to or more than a threshold value, and determines that the chroma dynamic range needs not to be changed when the ratio is less than the threshold value.

When the determination at step S41 is "YES", the system control unit 11 drives the imaging device driving unit 10 to perform a main imaging according to the proper exposure value Th1 determined based on the first light-measuring value (step S42). The system control unit 11 performs the main imaging in a state where the exposure times of the narrow element group and the wide element group are the same.

The narrow signal and the wide signal obtained from the solid-state imaging device 5 in the imaging at step S42 are synchronized in the digital signal processing unit 17 to be generated into the narrow imaging image data and the wide imaging image data, respectively (step S43).

Next, the digital signal processing unit 17 generates the luminance signal $Y_N$ and the chrominance signals $Cr_N$, $Cb_N$ from the narrow imaging image data generated at step S43. Further, the digital signal processing unit 17 generates the luminance signal $Y_W$ and the chrominance signals $Cr_W$, $Cb_W$ from the wide imaging image data generated at step S43. Next, the digital signal processing unit 17 generates the luminance signal Y and the chrominance signals Cr, Cb by the first processing (step S44). That is, the digital signal processing unit 17 makes the luminance signal $Y_N$ as it is into a luminance signal Y, makes adding the chrominance signal $Cr_N$ and the chrominance signal $Cr_W$ in a predetermined ratio into a chrominance signal Cr, and makes the chrominance signal $Cb_N$ and the chrominance signal $Cb_W$ in the predetermined ratio into a chrominance signal Cb.

When the determination at step S41 is "NO", the system control unit 11 drives the imaging device driving unit 10 to perform the main imaging according to the proper exposure value Th1 determined based on the first light-measuring value (step S45). The system control unit 11 performs the main imaging in a state where the exposure times of the narrow element group and the wide element group are the same.

The narrow signal and the wide signal obtained from the solid-state imaging device 5 in the imaging at step S45 are synchronized in the digital signal processing unit 17 to be generated into the narrow imaging image data and the wide imaging image data, respectively (step S46).

Next, the digital signal processing unit 17 generates the luminance signal $Y_N$ and the chrominance signals $Cr_N$, $Cb_N$ from the narrow imaging image data generated at step S46. Further, the digital signal processing unit 17 generates the luminance signal $Y_W$ and the chrominance signals $Cr_W$, $Cb_W$ from the wide imaging image data generated at step S46. Next, the digital signal processing unit 17 generates the luminance signal Y and the chrominance signals Cr, Cb by the second processing (step S47). That is, the digital signal processing unit 17 makes the luminance signal $Y_N$ as it is into a luminance signal Y, makes the chrominance signal $Cr_N$ as it is into a chrominance signal Cr, and makes the chrominance signal $Cb_N$ as it is into a chrominance signal Cb.

The imaging image data constituted by the luminance signals Y and the chrominance signals Cr, Cb generated at steps S44, S47 is compressed, and then, is recorded to the recording medium 21. Then, the operation of the imaging is completed.

Figure 7:
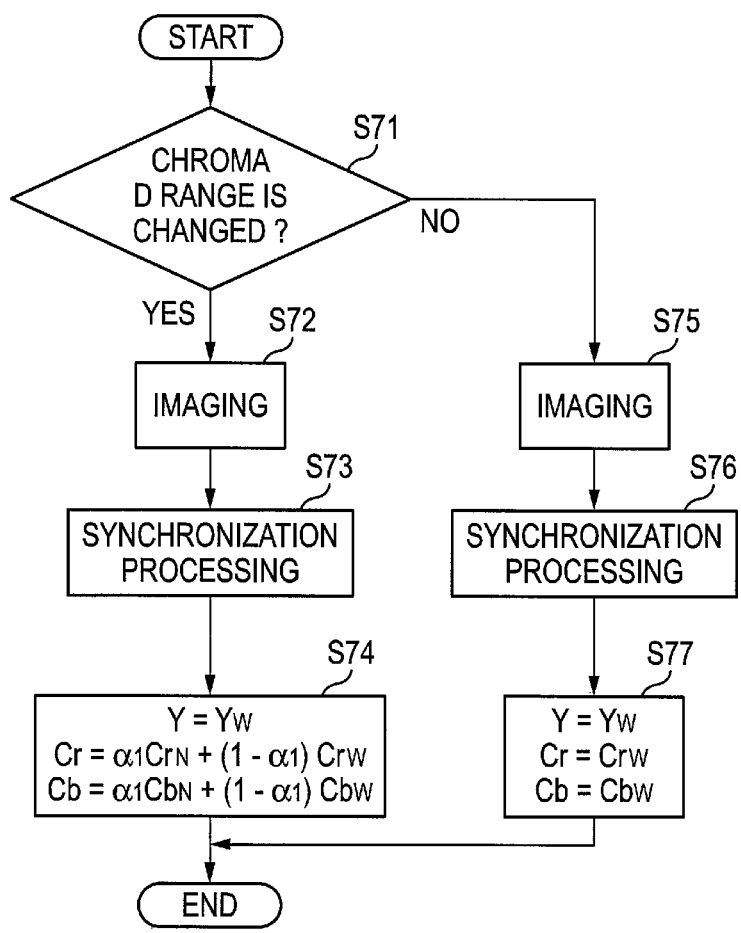
FIG. 7 is a flow chart illustrating the detailed description of a wide priority processing (step S7) in the flow chart illustrated in FIG. 5.

FIG. 7 is a flow chart illustrating the content of step S7 in the flow chart illustrated in FIG. 5.

When the wide priority processing is initiated, the system control unit 11 determines whether the chroma dynamic range is changed based on the wide signal obtained at the preparatory imaging (step S71).

Specifically, the system control unit 11 synchronizes the wide signal, which is obtained at the preparatory imaging, in the digital signal processing unit 17 to generate a wide imaging image data. The system control unit 11 calculates a ratio where the color saturated imaging pixel signal of the wide imaging image data occupies over the entire wide imaging image data. Further, the system control unit 11 determines that the chroma dynamic range is to be changed when the ratio is equal to or more than a threshold value, and determines that the chroma dynamic range needs not to be changed when the ratio is less than the threshold value.

When the determination at step S71 is "YES", the system control unit 11 drives the imaging device driving unit 10 to perform a main imaging according to the proper exposure value Th2 determined based on the second light-measuring value (step S72). The system control unit 11 performs the main imaging in a state where the exposure times of the narrow element group and the wide element group are the same.

The narrow signal and the wide signal obtained from the solid-state imaging device 5 in the imaging at step S72 are synchronized in the digital signal processing unit 17 to be generated into the narrow imaging image data and the wide imaging image data, respectively (step S73).

Next, the digital signal processing unit 17 generates the luminance signal $Y_N$ and the chrominance signals $Cr_N$, $Cb_N$ from the narrow imaging image data generated at step S73. Further, the digital signal processing unit 17 generates the luminance signal $Y_W$ and the chrominance signals $Cr_W$, $Cb_W$ from the wide imaging image data generated at step S73. Next, the digital signal processing unit 17 generates the luminance signal Y and the chrominance signals Cr, Cb by the third processing (step S74). That is, the digital signal processing unit 17 makes the luminance signal $Y_W$ as it is into a luminance signal Y, makes adding the chrominance signal $Cr_N$ and the chrominance signal $Cr_W$ in a predetermined ratio into a chrominance signal Cr, and makes the chrominance signal $Cb_N$ and the chrominance signal $Cb_W$ in the predetermined ratio into a chrominance signal Cb.

Meanwhile, when the determination at step S71 is "NO", the system control unit 11 drives the imaging device driving unit 10 to perform the main imaging according to the proper exposure value Th2 determined based on the second light-measuring value (step S75). The system control unit 11 performs the main imaging in a state where the exposure times of the narrow element group and the wide element group are the same.

The narrow signal and the wide signal obtained from the solid-state imaging device 5 in the imaging at step S75 are synchronized in the digital signal processing unit 17 to be generated into the narrow imaging image data and the wide imaging image data, respectively (step S76).

Next, the digital signal processing unit 17 generates the luminance signal $Y_N$ and the chrominance signals $Cr_N$, $Cb_N$ from the narrow imaging image data generated at step S76. Further, the digital signal processing unit 17 generates the luminance signal $Y_W$ and the chrominance signals $Cr_W$, $Cb_W$ from the wide imaging image data generated at step S76. Next, the digital signal processing unit 17 generates the luminance signal Y and the chrominance signals Cr, Cb by the fourth processing (step S77). The digital signal processing unit 17 makes the luminance signal $Y_W$ as it is into a luminance signal Y, makes the chrominance signal $Cr_W$ as it is into a chrominance signal Cr, and makes the chrominance signal $Cb_W$ as it is into a chrominance signal Cb.

The imaging image data constituted by the luminance signals Y and the chrominance signals Cr, Cb generated at steps S74, S77 is compressed, and then, is recorded to the recording medium 21. And then, the operation of the imaging is completed.

Figure 8:
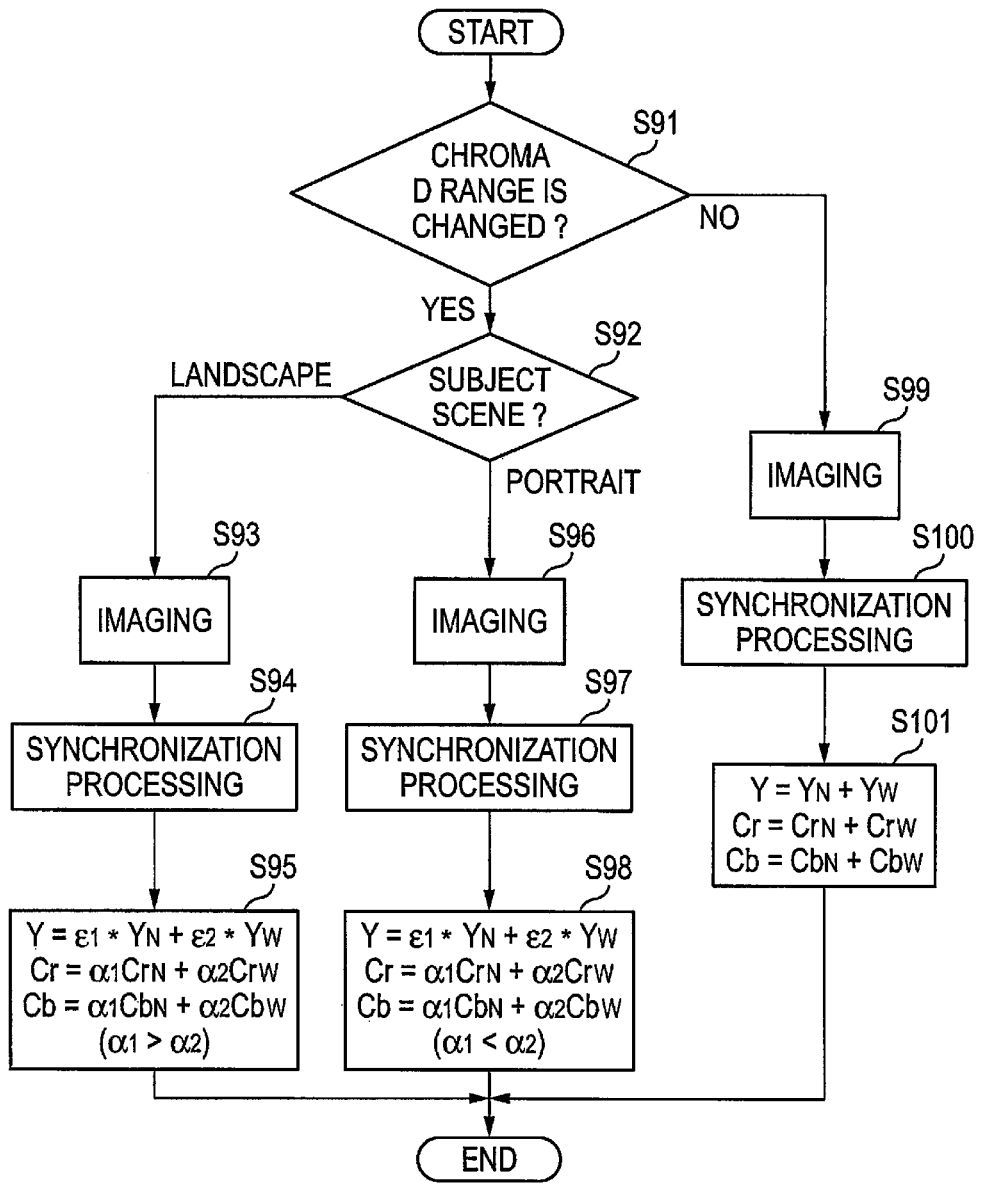
FIG. 8 is a flow chart illustrating the detailed description of a narrow wide adding processing (step S9) in the flow chart illustrated in FIG. 5.

FIG. 8 is a flow chart illustrating the content of step S9 in the flow chart illustrated in FIG. 5.

When the narrow•wide priority processing is initiated, the system control unit 11 determines whether the chroma dynamic range is changed based on the narrow signal or the wide signal obtained at the preparatory imaging (step S91).

Specifically, the system control unit 11 determines the subject scene to be imaged based on the narrow signal or the wide signal obtained at the preparatory imaging. The system control unit 11 determines that the chroma dynamic range is changed when the subject scene is a subject scene that puts the color reproducibility first (a scene including a portrait or a landscape), and determines that the chroma dynamic range needs not to be changed when the subject scene is a subject scene that puts the sensitivity first (a scene including a nightscape). Meanwhile, the system control unit 11 determines that the chroma dynamic range needs not to be changed when the subject scene is not determined.

When the determination at step S91 is "YES", the system control unit 11 determines that the subject scene is one of a scene including a landscape as a main subject and a scene including a portrait as a main subject (step S92).

When the subject scene is the scene including a landscape in the determination at step S92, the system control unit 11 drives the imaging device driving unit 10 to perform the main imaging according to the proper exposure value Th2 determined based on the second light-measuring value (step S93). The system control unit 11 performs the main imaging in a state where the exposure times of the narrow element group and the wide element group are the same.

The narrow signal and the wide signal obtained from the solid-state imaging device 5 in the imaging at step S93 are synchronized in the digital signal processing unit 17 to be generated into the narrow imaging image data and the wide imaging image data, respectively (step S94).

Next, the digital signal processing unit 17 generates the luminance signal $Y_N$ and the chrominance signals $Cr_N$, $Cb_N$ from the narrow imaging image data generated at step S94. Further, the digital signal processing unit 17 generates the luminance signal $Y_W$ and the chrominance signals $Cr_W$, $Cb_W$ from the wide imaging image data generated at step S94. Next, the digital signal processing unit 17 generates the luminance signal Y and the chrominance signals Cr, Cb by the fifth processing (step S95). That is, the digital signal processing unit 17 makes adding the luminance signal $Y_W$ and the luminance signal $Y_N$ in a predetermined ratio into a luminance signal Y, makes adding the chrominance signal $Cr_N$ and the chrominance signal $Cr_W$ in a ratio where the ratio of the chrominance signal $Cr_N$ is more than the chrominance signal $Cr_W$ into a chrominance signal Cr, and makes adding the chrominance signal $Cb_N$ and the chrominance signal $Cb_W$ in a ratio where the ratio of the chrominance signal $Cb_N$ is more than the chrominance signal $Cb_W$ into a chrominance signal Cb.

Meanwhile, when the subject scene is the scene including a portrait in the determination at step S92, the system control unit 11 drives the imaging device driving unit 10 to perform the main imaging according to the proper exposure value Th2 determined based on the second light-measuring value (step S96). The system control unit 11 performs the main imaging in a state where the exposure times of the narrow element group and the wide element group are the same.

The narrow signal and the wide signal obtained from the solid-state imaging device 5 in the imaging at step S96 are synchronized in the digital signal processing unit 17 to be generated into the narrow imaging image data and the wide imaging image data, respectively (step S97).

Next, the digital signal processing unit 17 generates the luminance signal $Y_N$ and the chrominance signals $Cr_N$, $Cb_N$ from the narrow imaging image data generated at step S97. Further, the digital signal processing unit 17 generates the luminance signal $Y_W$ and the chrominance signals $Cr_W$, $Cb_W$ from the wide imaging image data generated at step S97. Next, the digital signal processing unit 17 generates the luminance signal Y and the chrominance signals Cr, Cb by the sixth processing (step S98). That is, the digital signal processing unit 17 makes adding the luminance signal $Y_W$ and the luminance signal $Y_N$ in a predetermined ratio into a luminance signal Y, makes adding the chrominance signal $Cr_N$ and the chrominance signal $Cr_W$ in a ratio where the ratio of the chrominance signal $Cr_W$ is more than the chrominance signal $Cr_N$ into a chrominance signal Cr, and makes adding the chrominance signal $Cb_N$ and the chrominance signal $Cb_W$ in a ratio where the ratio of the chrominance signal $Cb_W$ is more than the chrominance signal $Cb_N$ into a chrominance signal Cb.

When the determination at step S91 is "NO", the system control unit 11 drives the imaging device driving unit 10 to perform the main imaging according to the proper exposure value Th2 determined based on the second light-measuring value (step S99). The system control unit 11 performs the main imaging in a state where the exposure times of the narrow element group and the wide element group are the same.

The narrow signal and the wide signal obtained from the solid-state imaging device 5 in the imaging at step S99 are synchronized in the digital signal processing unit 17 to be generated into the narrow imaging image data and the wide imaging image data, respectively (step S100).

Next, the digital signal processing unit 17 generates the luminance signal $Y_N$ and the chrominance signals $Cr_N$, $Cb_N$ from the narrow imaging image data generated at step S100. Further, the digital signal processing unit 17 generates the luminance signal $Y_W$ and the chrominance signals $Cr_W$, $Cb_W$ from the wide imaging image data generated at step S100. Next, the digital signal processing unit 17 generates the luminance signal Y and the chrominance signals Cr, Cb by the seventh processing (step S101). That is, the digital signal processing unit 17 makes simply adding the luminance signal $Y_N$ and the chrominance signal $Y_W$ into a luminance signal Y, makes simply adding the chrominance signal $Cr_N$ and the chrominance signal $Cr_W$ into a chrominance signal Cr, and makes simply adding the chrominance signal $Cb_N$ and the chrominance signal $Cb_W$ into a chrominance signal Cb.

The imaging image data constituted by the luminance signals Y and the chrominance signals Cr, Cb generated at steps S95, S98, S101 is compressed, and then, is recorded to the recording medium 21. And then, the operation of the imaging is completed.

In this way, the digital camera illustrated in FIG. 1 generates an imaging image data using the narrow signal obtained from the narrow element group as a main when the subject is bright (when the first light-measuring value is equal to or more than the threshold value Th1). For that reason, good color reproducibility for the bright subject may be realized. Further, when the color saturation occurs, the color saturation may be prevented by changing the chroma using the information of the wide signal.

Further, the digital camera illustrated in FIG. 1 generates an imaging image data using the wide signal obtained from the wide element group as a main when the subject is dark (when the first light-measuring value is less than the threshold value Th1 and the second light-measuring value is equal to or more than the threshold value Th). For that reason, good color reproducibility even for the dark subject may be realized. Further, when the color saturation occurs, the color saturation may be prevented by changing the chroma using the information of the narrow signal.

Further, the digital camera illustrated in FIG. 1 generates an imaging image data using both of the narrow signal obtained from the narrow element group and the wide signal obtained from the wide element group when the subject is even dark (when the second light-measuring value is less than the threshold value Th2). For that reason, good color reproducibility with high sensitivity for the even dark subject may be realized. Further, a using ratio of the narrow signal and the wide signal may be changed according to the subject scene, thereby obtaining the optimal image quality according to the subject scene.

In this way, according to the digital camera illustrated in FIG. 1, a subject, from the bright subject to the even dark subject, may be imaged while the color reproducibility is finely secured. For that reason, even a user who is not used to the using method of the digital camera may obtain the optimal image quality under various light amount only by determining an angle of view and pressing the shutter button. As a result, a good usability camera may be realized.

Meanwhile, when the determination at step S3 is "YES" (when the subject is bright), the wide priority processing, not the narrow priority processing, may be performed. In this case, the proper exposure is determined from the light-receiving amount of the narrow element group, and thus, the proper exposure needs to be calculated again based on the light-receiving amount of the wide element group. In this way, when the wide priority processing is performed after the proper exposure is calculated again, the exposure amount of the narrow element group is lacked (S/N is lowered), the color noise is increased compared to a case where the narrow priority processing is performed. As a result, as illustrated in FIG. 5, when the subject is bright, the narrow priority processing may be performed.

Meanwhile, in the above description, the imaging device driving unit 10 performs a driving where the exposure times of the narrow element group and the wide element group are the same at the main imaging. However, the imaging device driving unit 10 may perform a driving where the exposure times of the narrow element group and the wide element group are different from each other at the main imaging.

For example, in the imaging at step S42 of FIG. 6, the exposure time of the wide element group may be shorter than the exposure time of the narrow element group.

After the imaging at step S42 of FIG. 6, as illustrated at step S44, the first processing to change the chroma is performed. In the performance of the first processing, when the wide signal obtained from the wide element group is saturated, the improvement effect of the color reproducibility by the first processing is decreased. The wide element group is higher sensitivity than the narrow element group. For that reason, when the exposure time of the wide element group becomes the same as the exposure time of the narrow element group, the wide element group accumulates the charge more than the narrow element group, and thus, the wide element group is easily to be saturated. Therefore, when the exposure time of the wide element group is shorter than the exposure time of the narrow element group, the wide element group may be prevented from being saturated. Of course, when it is premised that the wide element group is not saturated, the exposure times of the wide element group and the narrow element group may be the same, as described above.

Meanwhile, in the imaging at step S45 of FIG. 6, the exposure time of the wide element group may become the same as the exposure time of the narrow element group, or the exposure time of the wide element group may be shorter than the exposure time of the narrow element group. Considering the simplicity of the driving, the exposure times of the wide element group and the narrow element group may be the same. Further, in the imaging at step S45 of FIG. 6, the signal may not be read out from the wide element group.

Further, in the imaging at step S72 of FIG. 7, the exposure time of the narrow element group may be shorter than the exposure time of the wide element group.

After the imaging at step S72 of FIG. 7, the third processing to change the chroma is performed, as illustrated in step S74. In the performance of the third processing, when the narrow signal obtained from the narrow element group is saturated, the improvement effect of the color reproducibility by the third processing is decreased. Therefore, when the exposure time of the narrow element group is shorter than the exposure time of the wide element group, the narrow element group may be prevented from being saturated. Of course, when it is premised that the narrow element group is not saturated, the exposure times of the wide element group and the narrow element group may be the same, as described above.

Meanwhile, in the imaging at step S75 of FIG. 7, the exposure time of the narrow element group may become the same as the exposure time of the wide element group, or the exposure time of the narrow element group may be shorter than the exposure time of the wide element group. Considering the simplicity of the driving, the exposure times of the wide element group and the narrow element group may be the same. Further, in the imaging at step S75 of FIG. 7, the signal may not be read out from the narrow element group.

Further, in the description as above, the digital signal processing unit 17 changes the generating method of the luminance signal Y and the chrominance signals Cr, Cb by the operation. However, just in a case of the narrow wide adding processing, the generating method of the luminance signal Y and the chrominance signals Cr, Cb may be changed by the control of the exposure times of the narrow element group and the wide element group.

For example, in the imaging at steps S93, S96 of FIG. 8, the system control unit 11 determines the exposure time ratio of the narrow element group and the wide element group according to the subject scene or the necessary dynamic range, and then performs the imaging. That is, in the imaging at step S93, the system control unit 11 performs the imaging in a state where the exposure time of the narrow element group is longer than the exposure time of the wide element group, and in the imaging at step S96, the system control unit 11 performs the imaging in a state where the exposure time of the wide element group is longer than the exposure time of the narrow element group.

In this way, the luminance•chrominance signal generating unit 173 generates a luminance signal Y by simply adding the luminance signal $Y_W$ and the luminance signal $Y_N$, generates a chrominance signal Cr by simply adding the chrominance signal $Cr_y$, and the chrominance signal $Cr_N$, and generates a chrominance signal Cb by simply adding the chrominance signal $Cb_W$ and the chrominance signal $Cb_N$.

Next, a specific example in which the exposure times of the narrow element group and the wide element group are exchanged each other, will be described. Hereinafter, a driving where the exposure time of the narrow element group is longer than the exposure time of the wide element group refers to as "a narrow priority driving", and a driving where the exposure time of the wide element group is longer than the exposure time of the narrow element group refers to as "a wide priority driving".

Figure 9:
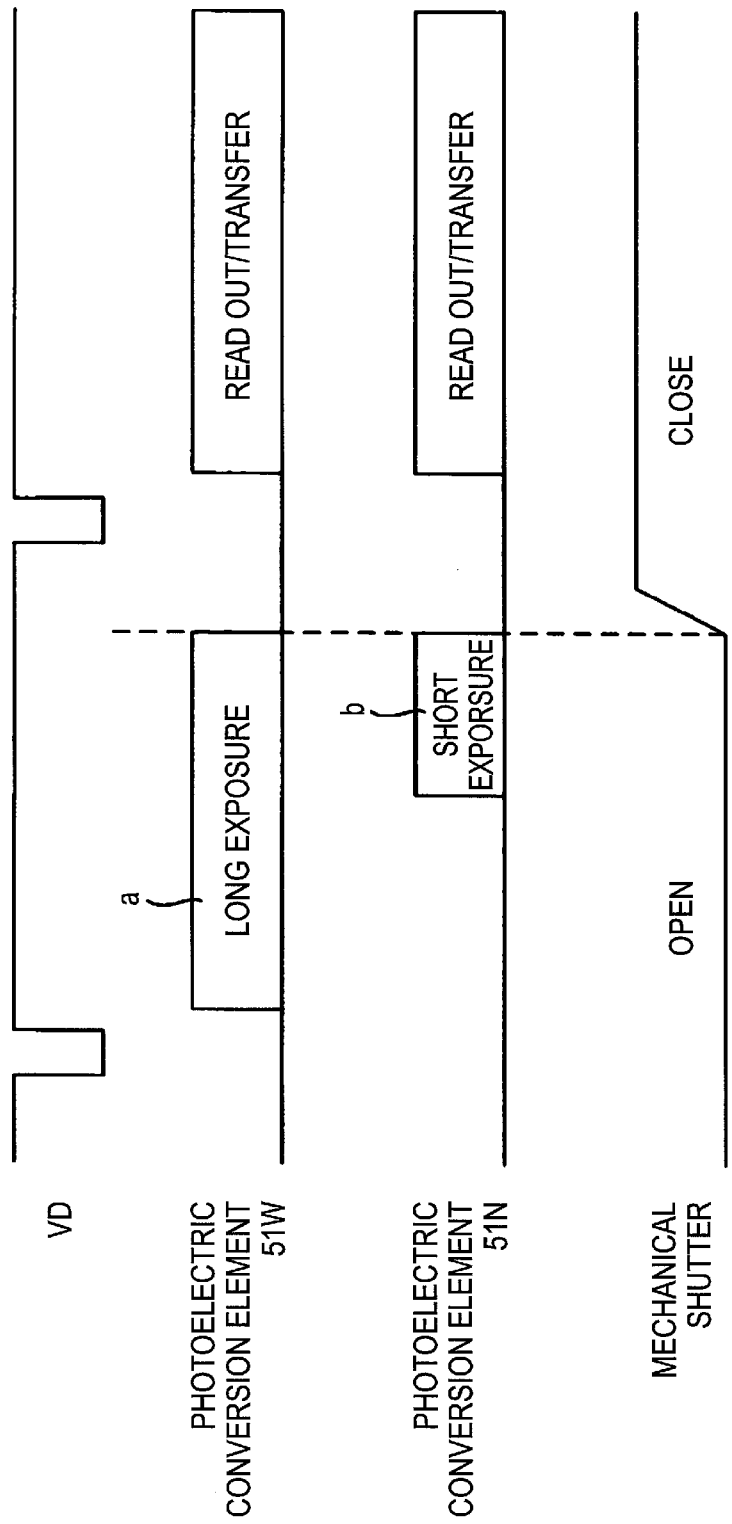
FIG. 9 is a view for describing a wide priority driving that is performed by an imaging device driving unit 10 in the digital camera illustrated in FIG. 1.

FIG. 9 is a view for describing the wide priority driving that is performed by the imaging device driving unit 10 in the digital camera illustrated in FIG. 1.

In the wide priority driving, when the imaging instructions exists, the imaging device driving unit 10 opens the mechanical shutter, and stops a supply of the electronic shutter pulse which is being applied to the solid-state imaging device 5 by that time. As a result of the stop of the electronic shutter pulse, the exposure time period a of each photoelectric conversion element 51W is initiated. Next, during the exposure time period a, the imaging device driving unit 10 applies an read-out pulse to the transfer electrodes V1 and V5, and reads out charges from each of the photoelectric conversion elements 51N to the vertical charge transfer units 54. As a result of the stop of the application of the read-out pulse, the exposure time period b of each of the photoelectric conversion elements 51N is initiated.

After the exposure time period b is initiated, the imaging device driving unit 10 applies a pulse to the transfer electrodes V1 to V8 to perform transmission that sweeps off the charges read-out from each of the photoelectric conversion elements 51N.

Next, when the exposure time period a reaches a timing of termination, the imaging device driving unit 10 closes the mechanical shutter. As such, the exposure time period a is terminated, and the exposure time period b is also terminated at the same time.

Thereafter, the imaging device driving unit 10 applies the read-out pulse to the transfer electrodes V1, V3, V5 and V7, and reads out the charges from each of the photoelectric conversion elements 51W and 51N to the vertical charge transfer units 54. Subsequently, the imaging device driving unit 10 applies a pulse to the transfer electrodes V1 to V8, and outputs signals, which correspond to the charges read out from each of the photoelectric conversion elements 51W and 51N, from the solid-state imaging device 5.

In this way, a driving may be realized, in which the photoelectric conversion elements 51W of the wide element group are exposed in a time period longer than the photoelectric conversion elements 51N of the narrow element group.

Figure 10:
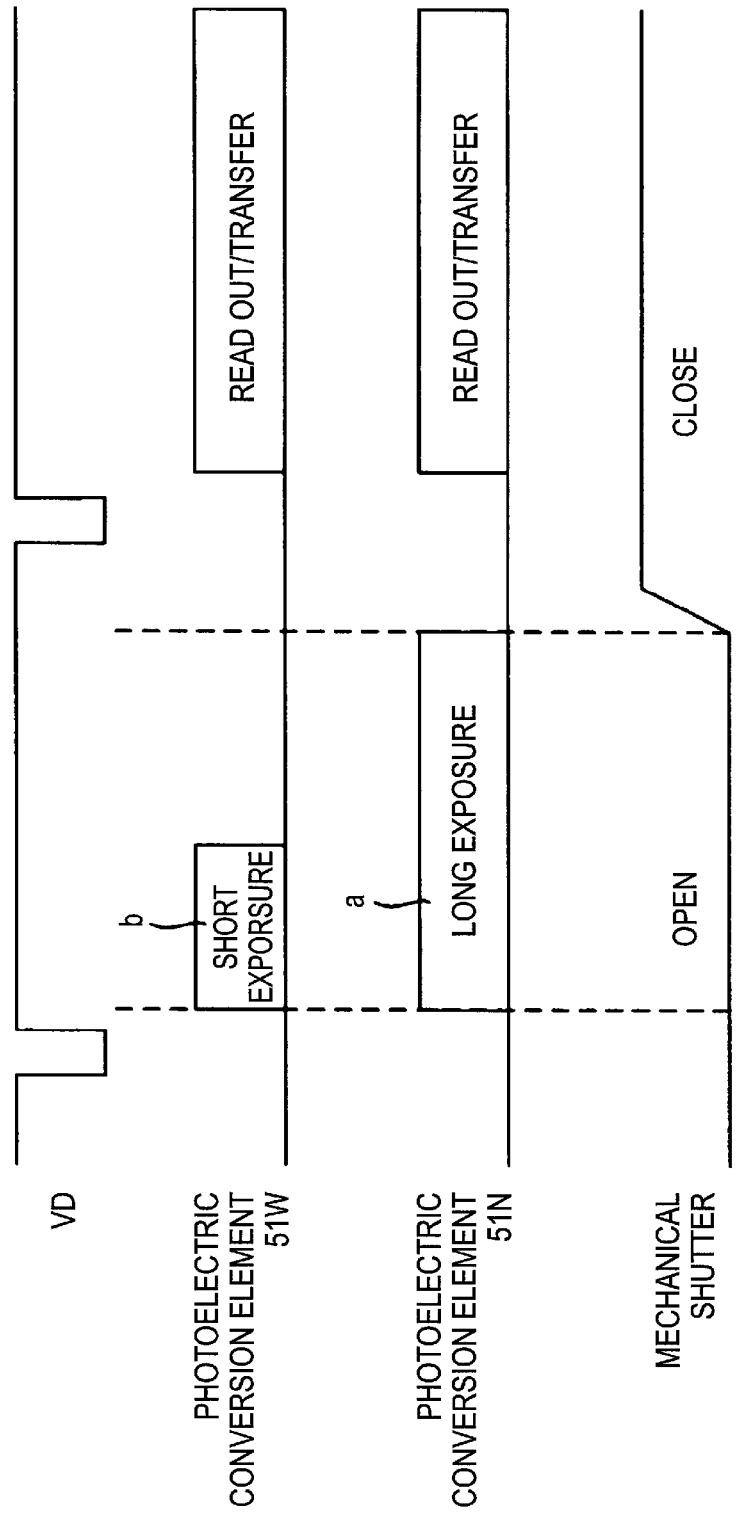
FIG. 10 is a view for describing a narrow priority driving that is performed by the imaging device driving unit 10 in the digital camera illustrated in FIG. 1.

FIG. 10 is a view for describing the narrow priority driving that is performed by the imaging device driving unit 10 in the digital camera illustrated in FIG. 1.

In the narrow priority driving, when an imaging instruction is present, the imaging device driving unit 10 opens the mechanical shutter, and stops a supply of the electronic shutter pulse which has been applied to the semiconductor substrate of the solid-state imaging device 5 by that time. As a result of the stop of the electronic shutter pulse, the exposure time period a of each of the photoelectric conversion elements 51N and the exposure time period b of each of the photoelectric conversion elements 51W are initiated concurrently.

Next, during the exposure time period a, the imaging device driving unit 10 applies a read-out pulse to the transfer electrodes V3 and V7, and reads out charges from each of the photoelectric conversion elements 51W to the vertical charge transfer units 54. As a result of the stop of the application of the read-out pulse, the exposure time period b of each photoelectric conversion element 51W is terminated.

Next, when the exposure time period a reaches a timing of termination, the imaging device driving unit 10 closes the mechanical shutter. Accordingly, the exposure time period a is terminated.

Thereafter, the imaging device driving unit 10 applies the read-out pulse to the transfer electrodes V1 and V5, and reads out the charges from each of the photoelectric conversion elements 51N to the vertical charge transfer units 54. Subsequently, the imaging device driving unit 10 applies a pulse to the transfer electrodes V1 to V8, and outputs signals, which correspond to the charges read out from each of the photoelectric conversion elements 51W and 51N, from the solid-state imaging device 5.

In this way, a driving may be realized, in which the photoelectric conversion elements 51N of the narrow element group are exposed in a time period longer than the photoelectric conversion elements 51W of the wide element group.

In the above description, even though the photoelectric conversion elements 51W and the photoelectric conversion elements 51N constituting the pairs meet the above-described conditions (1) to (5), but the conditions of at least (1) to (3) may be satisfied to obtain an optimal image quality under a wide range of light intensity.

Because that, when the conditions (1), (3) are not satisfied, an effect such as an optimization of the color reproducibility according the light intensity is not obtained, and that, when the condition (2) is not satisfied, the correlation of the signals obtained from the pair becomes decreased. Meanwhile, when the condition (4) is met, the image quality can be further improved. Further, when the condition (5) is met, the image quality can be further improved.

As a method of differentiating the spectral sensitivity characteristics in a photoelectric conversion element 51W and a photoelectric conversion element 51N forming a pair, following methods may be employed.

That is, the spectral sensitivity characteristics of the color filter R1 and the color filter R2 are made to be equal to each other, the spectral sensitivity characteristics of the color filter G1 and the color filter G2 are made to be equal to each other, and the spectral sensitivity characteristics of the color filter B1 and the color filter B2 are made to be equal to each other. In addition, the photoelectric conversion element 51W and the photoelectric conversion element 51N of the pair are made to be different in structure, so that a difference in spectral sensitivity characteristic is provided between the photoelectric conversion element 51W and the photoelectric conversion element 51N. For example, there is a method of changing a depth of a pn junction face of the photodiode constituting the photoelectric conversion element 51W with a depth of a pn junction face of the photodiode constituting the photoelectric conversion element 51N, among the photoelectric conversions elements 51W and 51N forming pairs.

Figure 11:
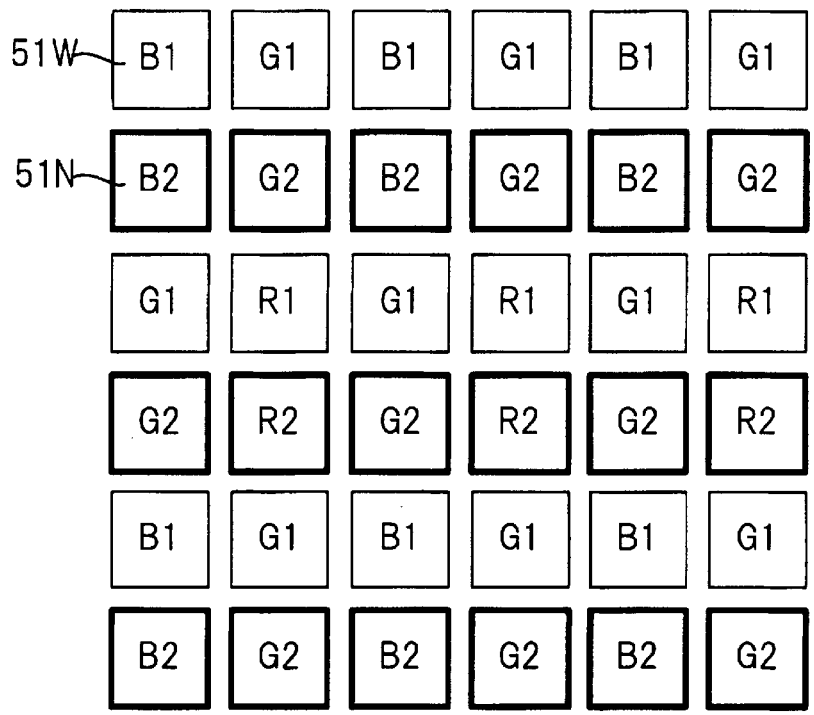
FIG. 11 is a view for describing a wide priority driving that is performed by the imaging device driving unit 10 in the digital camera illustrated in FIG. 1.
Figure 12:
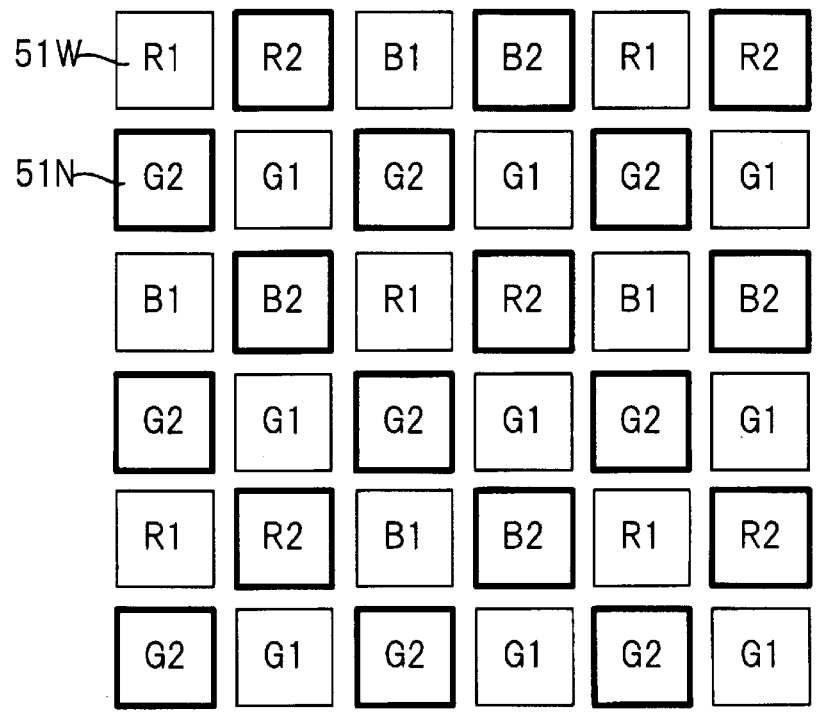
FIG. 12 is a view for describing a narrow priority driving that is performed by the imaging device driving unit 10 in the digital camera illustrated in FIG. 1.

Further, the arrays of the respective photoelectric conversion elements 51W and 51N of the solid-state imaging device 5 may be formed as illustrated in FIGS. 11 and 12.

FIG. 11 is a view illustrating a modification of the solid-state imaging device illustrated in FIG. 2. The solid-state imaging device of the modification is a one in which a plurality of photoelectric conversion elements are arranged in a square lattice type, the odd-number columns thereof are made of the photoelectric conversion elements 51W and the even-number columns thereof are made of the photoelectric conversion elements 51N.

FIG. 12 is a view illustrating another modification of the solid-state imaging device illustrated in FIG. 2. The solid-state imaging device of the modification is a one in which a plurality of photoelectric conversion elements are arranged into a square lattice type, the photoelectric conversion elements 51W are disposed in one side of a check pattern positions and the photoelectric conversion elements 51N are disposed in the other side of the check pattern positions.

Even in the array as illustrated in FIG. 11, the processings as described above may be applied by handling each photoelectric conversion element 51W and a photoelectric conversion element 51N adjacent to the photoelectric conversion element 51W in the down direction as a pair. Further, even in the array as illustrated in FIG. 12, the processings as described above may be applied by handling each photoelectric conversion element 51W and a photoelectric conversion element 51N adjacent to the photoelectric conversion element 51W in the right direction as a pair in the odd-number rows, and handling each photoelectric conversion element 51W and a photoelectric conversion element 51N adjacent to the photoelectric conversion element 51W in the left direction as a pair in the even-number rows.

In the description above, the solid-state imaging device 5 is adapted to have the three types of pairs, and to detect three primary colors of R, G, and B using the three types of pairs, but it is not limited to this. For example, complementary colors of cyan, magenta, and yellow may be configured to be detected using the three types of pairs, respectively. Further, the pairs are not limited to the three types. If at least two types of pairs are present, a color imaging can be performed.

Further, the solid-state imaging device 5 is not limited to the CCD type, and it may be a metal oxide semiconductor (MOS) type. In this case, as disclosed in Japanese Patent Application Laid-Open No. 2007-124137, a scanning circuit and a correlated double sampling (CDS) circuit may be separately installed in the first group and the second group. Further, in this case, only signal amplification processing may be adapted to be performed in the analog signal processing unit 6.

Further, the present invention is not limited to the solid-state imaging device 5 illustrated in FIG. 2, but may applied to a known solid-state imaging device such as, for example, a rear-surface illumination type imaging device or a stacked type imaging device (an imaging device in which a photoelectric conversion layer is disposed above a silicon substrate).

As described above, the following matters are disclosed herein.

The disclosed imaging apparatus is an imaging apparatus including a solid-state imaging device that has a plurality of pairs of a first photoelectric conversion element and a second photoelectric conversion element, which have different spectral sensitivity characteristics, respectively. In the imaging apparatus, a wavelength range where the first photoelectric conversion element of each pair mainly has a spectral sensitivity and a wavelength range where the second photoelectric conversion element of the pair mainly has a spectral sensitivity fall within the respective wavelength ranges of specific colors of visible light, the plurality of pairs include a plurality of types of pairs having different specific colors, a half width in the spectral sensitivity characteristic of the second photoelectric conversion element of each pair is wider than a half width in the spectral sensitivity characteristic of the first photoelectric conversion element of the pair. The imaging apparatus includes: a first signal generating unit configured to generate a first luminance signal and a first color signal using an imaging signal outputted from the plurality of first photoelectric conversion elements and generate a second luminance signal and a second color signal using an imaging signal outputted from the plurality of second photoelectric conversion elements; a second signal generating unit configured to generate a third luminance signal for a recordation to a recording medium using at least one of the first luminance signal and the second luminance signal and generate a third color signal for a recordation to the recording medium using at least one of the first color signal and the second color signal; and a light-measuring unit configured to obtain and measure the imaging signals outputted from each of the first photoelectric conversion elements and each of the second photoelectric conversion elements. The second signal generating unit changes the generating method of the third luminance signal and the generating method of the third color signal based on the results of the photometry performed by the light-measuring unit.

The disclosed imaging apparatus is configured such that, in a first case where a first light-measuring value obtained by light-measuring using the imaging signals outputted from the plurality of first photoelectric conversion elements is equal to or more than a first threshold value which is a proper exposure value determined based on the first light-measuring value, the second signal generating unit switches a first processing and a second processing according to the imaging signals outputted from the plurality of first photoelectric conversion elements, the first processing is a processing in which the first luminance signal as it is becomes the third luminance signal, and adding the first color signal and the second color signal in a predetermined ratio becomes the third color signal, and the second processing is a processing in which the first luminance signal as it is becomes the third luminance signal, and the first color signal as it is becomes the third color signal.

The disclosed imaging apparatus is configured such that, in a second case where the first light-emitting value is less than the first threshold value, and a second light-measuring value obtained by light-measuring using the imaging signals outputted from the plurality of second photoelectric conversion elements is equal to or more than a second threshold value which is a proper exposure value determined based on the second light-measuring value, the second signal generating unit switches a third processing and a fourth processing according to the imaging signals outputted from the plurality of first photoelectric conversion elements, the third processing is a processing in which the second luminance signal as it is becomes the third luminance signal, and adding the first color signal and the second color signal in a predetermined ratio becomes the third color signal, and the fourth processing is a processing in which the second luminance signal as it is becomes the third luminance signal, and the second color signal as it is becomes the third color signal.

The disclosed imaging apparatus is configured such that, in a third case where the second light-measuring value is less than the second threshold value, the second signal generating unit switches a fifth processing, a sixth processing, and a seventh processing according to a subject scene, the fifth processing is a processing in which adding the first luminance signal and the second luminance signal in a predetermined ratio becomes the third luminance signal, and adding the first color signal and the second color signal in a ratio where the ratio of the first color signal is more than the second color signal becomes the third color signal, the sixth processing is a processing in which adding the first luminance signal and the second luminance signal in a predetermined ratio becomes the third luminance signal, and adding the first color signal and the second color signal in a ratio where the ratio of the second color signal is more than the first color signal becomes the third color signal, and the seventh processing is a processing in which simply adding the first luminance signal and the second luminance becomes the third luminance signal, and simply adding the first color signal and the second color signal becomes the third color signal.

The disclosed imaging apparatus is configured such that, in the third case, the second signal generating unit performs one of the fifth processing and the sixth processing in a subject scene that prioritizes color reproducibility and performs the seventh processing in a subject scene that prioritizes sensitivity.

The disclosed imaging apparatus is configured such that the subject scene that prioritizes the color reproducibility includes a scene that includes a portrait as a main subject and a scene that includes a landscape as a main subject, the subject scene that prioritizes the sensitivity includes a scene that includes a nightscape, and the second signal generating unit performs the fifth processing in the scene including the landscape and performs the sixth processing in the scene including the portrait.

The disclosed imaging apparatus further includes a driving unit configured to drive the solid-state imaging device, and is configured such that the driving unit switches a first driving in which an exposure time of a first group constituted by the plurality of first photoelectric conversion elements is longer than the exposure time of a second group constituted by the plurality of second photoelectric conversion elements, a second driving in which the exposure time of the second group is longer than the exposure time of the first group, and a third driving in which the exposure times of the first group and the second group are the same, and the driving unit performs the first driving when the first processing is performed by the second signal generating unit, performs the second driving when the third processing is performed by the second signal generating unit, and performs the third driving when the seventh processing is performed by the second signal generating unit.

The disclosed imaging apparatus further includes a driving unit configured to drive the solid-state imaging device, and is configured such that, in a third case where the second light-measuring value is less than the second threshold value, the second signal generating unit performs an eighth processing in which simply adding the first luminance signal and the second luminance signal becomes the third luminance signal and simply adding the first color signal and the second color signal becomes the third color signal, the driving unit switches a first driving in which an exposure time of a first group constituted by the plurality of first photoelectric conversion elements is longer than the exposure time of a second group constituted by the plurality of second photoelectric conversion elements, a second driving in which the exposure time of the second group is longer than the exposure time of the first group, and a third driving in which the exposure times of the first group and the second group are the same, and in the third case, the driving unit performs one of the first driving and the second driving in a subject scene that prioritizes color reproducibility and performs the third driving in a subject scene that prioritizes sensitivity.

The disclosed imaging apparatus is configured such that the subject scene that prioritizes the color reproducibility includes a scene that includes a portrait as a main subject and a scene that includes a landscape as a main subject, the subject scene that prioritizes the sensitivity includes a scene that includes a nightscape, and the driving unit performs the first driving in the scene including the landscape and performs the second driving in the scene including the portrait.

The disclosed imaging apparatus is configured such that the solid-state imaging device includes color filters installed above each of the first photoelectric conversion elements and above each of the second photoelectric conversion elements, and a difference in spectral sensitivity characteristic between the first photoelectric conversion element and the second photoelectric conversion element in the pair is obtained according to a difference in spectral sensitivity characteristic between the respective color filters above the first and second photoelectric conversion elements.

The disclosed imaging apparatus is configured such that, each of the first photoelectric conversion elements and each of the second photoelectric conversion elements are disposed such that a first photoelectric conversion element line in which the first photoelectric conversion elements are arranged in a column direction and a second photoelectric conversion element line in which the second photoelectric conversion elements are arranged in the column direction are alternately arranged in a row direction intersecting the column direction, the second photoelectric conversion element line is disposed to be offset with respect to the first photoelectric conversion element line in the column direction by a half of an array pitch in the column direction of the first photoelectric conversion elements and the second photoelectric conversion elements, and each of the first photoelectric conversion elements and a second photoelectric conversion element adjacent to the first photoelectric conversion element in a predetermined direction form a pair.

The disclosed imaging apparatus is configured such that all the first photoelectric conversion elements and the second photoelectric conversion elements included in the solid-state imaging device have approximately the same configuration.

The disclosed imaging method is an imaging method using a solid-state imaging device that has a plurality of pairs of a first photoelectric conversion element and a second photoelectric conversion element, which have different spectral sensitivity characteristics, respectively. In the imaging method, a wavelength range where the first photoelectric conversion element of each pair mainly has a spectral sensitivity and a wavelength range where the second photoelectric conversion element of the pair mainly has a spectral sensitivity fall within the respective wavelength ranges of specific colors of visible light, the plurality of pairs include a plurality of types of pairs having different specific colors, a half width in the spectral sensitivity characteristic of the second photoelectric conversion element of each pair is wider than a half width in the spectral sensitivity characteristic of the first photoelectric conversion element of the pair. The imaging method includes: a first signal generating step that generates a first luminance signal and a first color signal using an imaging signal outputted from the plurality of first photoelectric conversion elements and generate a second luminance signal and a second color signal using an imaging signal outputted from the plurality of second photoelectric conversion elements; a second signal generating step that generates a third luminance signal for a recordation to a recording medium using at least one of the first luminance signal and the second luminance signal and generate a third color signal for a recordation to the recording medium using at least one of the first color signal and the second color signal; and a light-measuring step that obtains and measures the imaging signals outputted from each of the first photoelectric conversion elements and each of the second photoelectric conversion elements. The second signal generating step changes the generating method of the third luminance signal and the generating method of the third color signal based on the results of the photometry performed in the light-measuring step.

The disclosed imaging method is configured such that, in a first case where a first light-measuring value obtained by light-measuring using the imaging signals outputted from the plurality of first photoelectric conversion elements is equal to or more than a first threshold value which is a proper exposure value determined based on the first light-measuring value, the second signal generating step switches a first processing and a second processing according to the imaging signals outputted from the plurality of first photoelectric conversion elements, the first processing is a processing in which the first luminance signal as it is becomes the third luminance signal, and adding the first color signal and the second color signal in a predetermined ratio becomes the third color signal, and the second processing is a processing in which the first luminance signal as it is becomes the third luminance signal, and the first color signal as it is becomes the third color signal.

The disclosed imaging method is configured such that, in a second case where the first light-emitting value is less than the first threshold value, and a second light-measuring value obtained by light-measuring using the imaging signals outputted from the plurality of second photoelectric conversion elements is equal to or more than a second threshold value which is a proper exposure value determined based on the second light-measuring value, the second signal generating step switches a third processing and a fourth processing according to the imaging signals outputted from the plurality of first photoelectric conversion elements, the third processing is a processing in which the second luminance signal as it is becomes the third luminance signal, and adding the first color signal and the second color signal in a predetermined ratio becomes the third color signal, and the fourth processing is a processing in which the second luminance signal as it is becomes the third luminance signal, and the second color signal as it is becomes the third color signal.

The disclosed imaging method is configured such that, in a third case where the second light-measuring value is less than the second threshold value, the second signal generating step switches a fifth processing, a sixth processing, and a seventh processing according to a subject scene, the fifth processing is a processing in which adding the first luminance signal and the second luminance signal in a predetermined ratio becomes the third luminance signal, and adding the first color signal and the second color signal in a ratio where the ratio of the first color signal is more than the second color signal becomes the third color signal, the sixth processing is a processing in which adding the first luminance signal and the second luminance signal in a predetermined ratio becomes the third luminance signal, and adding the first color signal and the second color signal in a ratio where the ratio of the second color signal is more than the first color signal becomes the third color signal, and the seventh processing is a processing in which adding the first luminance signal and the second luminance simply becomes the third luminance signal, and adding the first color signal and the second color signal simply becomes the third color signal.

The disclosed imaging method is configured such that, in the third case, the second signal generating step performs one of the fifth processing and the sixth processing in a subject scene that prioritizes color reproducibility and performs the seventh processing in a subject scene that prioritizes sensitivity.

The disclosed imaging method is configured such that the subject scene that prioritizes the color reproducibility includes a scene that includes a portrait as a main subject and a scene that includes a landscape as a main subject, the subject scene that prioritizes the sensitivity includes a scene that includes a nightscape, and the second signal generating step performs the fifth processing in the scene including the landscape and performs the sixth processing in the scene including the portrait.

The disclosed imaging method further includes driving step that drives the solid-state imaging device, and is configured such that the driving step switches a first driving in which an exposure time of a first group constituted by the plurality of first photoelectric conversion elements is longer than the exposure time of a second group constituted by the plurality of second photoelectric conversion elements, a second driving in which the exposure time of the second group is longer than the exposure time of the first group, and a third driving in which the exposure times of the first group and the second group are the same, and the driving step performs the first driving when the first processing is performed in the second signal generating step, performs the second driving when the third processing is performed in the second signal generating step, and performs the third driving when the seventh processing is performed in the second signal generating step.

The disclosed imaging method further includes a driving step that drives the solid-state imaging device, and is configured such that in the disclosed imaging method, in a third case where the second light-measuring value is less than the second threshold value, the second signal generating step performs an eighth processing in which simply adding the first luminance signal and the second luminance signal becomes the third luminance signal and simply adding the first color signal and the second color signal becomes the third color signal, the driving step switches a first driving in which an exposure time of a first group constituted by the plurality of first photoelectric conversion elements is longer than the exposure time of a second group constituted by the plurality of second photoelectric conversion elements, a second driving in which the exposure time of the second group is longer than the exposure time of the first group, and a third driving in which the exposure times of the first group and the second group are the same, and in the third case, the driving step performs one of the first driving and the second driving in a subject scene that prioritizes color reproducibility and performs the third driving in a subject scene that prioritizes sensitivity.

The disclosed imaging method is configured such that the subject scene that prioritizes the color reproducibility includes a scene that includes a portrait as a main subject and a scene that includes a landscape as a main subject, the subject scene that prioritizes the sensitivity includes a scene that includes a nightscape, and the driving step performs the first driving in the scene including the landscape and performs the second driving in the scene including the portrait.

The disclosed imaging method is configured such that the solid-state imaging device includes color filters installed above each of the first photoelectric conversion elements and above each of the second photoelectric conversion elements, and a difference in spectral sensitivity characteristic between the first photoelectric conversion element and the second photoelectric conversion element in the pair is obtained according to a difference in spectral sensitivity characteristic between the respective color filters above the first and second photoelectric conversion elements.

The disclosed imaging method is configured such that each of the first photoelectric conversion elements and each of the second photoelectric conversion elements are disposed such that a first photoelectric conversion element line in which the first photoelectric conversion elements are arranged in a column direction and a second photoelectric conversion element line in which the second photoelectric conversion elements are arranged in the column direction are alternately arranged in a row direction intersecting the column direction, the second photoelectric conversion element line is disposed to be offset with respect to the first photoelectric conversion element line in the column direction by a half of an array pitch in the column direction of the first photoelectric conversion elements and the second photoelectric conversion elements, and each of the first photoelectric conversion elements and a second photoelectric conversion element adjacent to the first photoelectric conversion element in a predetermined direction form a pair.

The disclosed imaging method is configured such that all the first photoelectric conversion elements and the second photoelectric conversion elements included in the solid-state imaging device have approximately the same configuration.

INDUSTRIAL APPLICABILITY

According to the present invention, an imaging apparatus and an imaging method which are capable of obtaining an image with optimal color reproducibility under a wide range of light intensity conditions may be provided.

Although the present invention has been described in detail and with reference to specific embodiments thereof, it is obvious to those skilled in the art that various changes or modifications may be made without departing from the sprit and scope of the present invention.

The present application is based on a Japanese Patent Application (JP 2010-142000) filed on Jun. 22, 2010, and the disclosure of which is incorporated herein in its entirety by reference.

DESCRIPTION OF REFERENCE NUMERALS

5: solid-state imaging device
10: imaging device driving unit
51W, 51N: photoelectric conversion element

The invention claimed is:

1. An imaging apparatus comprising a solid-state imaging device that has a plurality of pairs of a first photoelectric conversion element and a second photoelectric conversion element, which have different spectral sensitivity characteristics, respectively,
wherein a wavelength range where the first photoelectric conversion element of each pair mainly has a spectral sensitivity and a wavelength range where the second photoelectric conversion element of the pair mainly has a spectral sensitivity fall within wavelength ranges of specific colors of visible light respectively,
the plurality of pairs include a plurality of types of pairs having different specific colors,
a half-width in a spectral sensitivity characteristic of the second photoelectric conversion element of each pair is wider than a half width in a spectral sensitivity characteristic of the first photoelectric conversion element of the pair,
the imaging apparatus further comprising:
a first signal generating unit that generates a first luminance signal and a first color signal using an imaging signal outputted from the plurality of first photoelectric conversion elements and generate a second luminance signal and a second color signal using an imaging signal outputted from the plurality of second photoelectric conversion elements;
a second signal generating unit that generates a third luminance signal for a recordation to a recording medium using at least one of the first luminance signal and the second luminance signal and generate a third color signal for a recordation to the recording medium using at least one of the first color signal and the second color signal; and
a light-measuring unit that obtains the imaging signals outputted from each of the first photoelectric conversion elements and each of the second photoelectric conversion elements to perform photometry,
wherein the second signal generating unit changes a generating method of the third luminance signal and a generating method of the third color signal based on results of the photometry performed by the light-measuring unit.

2. The imaging apparatus of claim 1,
wherein, in a first case where a first light-measuring value obtained by the photometry using the imaging signals outputted from the plurality of first photoelectric conversion elements is equal to or more than a first threshold value which is a proper exposure value determined based on the first light-measuring value, the second signal generating unit switches a first processing and a second processing according to the imaging signals outputted from the plurality of first photoelectric conversion elements,
the first processing is a processing in which the first luminance signal as it is becomes the third luminance signal, and an addition of the first color signal and the second color signal in a predetermined ratio becomes the third color signal, and
the second processing is a processing in which the first luminance signal as it is becomes the third luminance signal, and the first color signal as it is becomes the third color signal.

3. The imaging apparatus of claim 2,
wherein, in a second case where the first light-emitting value is less than the first threshold value, and a second light-measuring value obtained by the photometry using the imaging signals outputted from the plurality of second photoelectric conversion elements is equal to or more than a second threshold value which is a proper exposure value determined based on the second light-measuring value, the second signal generating unit switches a third processing and a fourth processing according to the imaging signals outputted from the plurality of second photoelectric conversion elements,
the third processing is a processing in which the second luminance signal as it is becomes the third luminance signal, and an addition of the first color signal and the second color signal in a predetermined ratio becomes the third color signal, and
the fourth processing is a processing in which the second luminance signal as it is becomes the third luminance signal, and the second color signal as it is becomes the third color signal.

4. The imaging apparatus of claim 3,
wherein, in a third case where the second light-measuring value is less than the second threshold value, the second signal generating unit switches a fifth processing, a sixth processing, and a seventh processing according to a subject scene, the fifth processing is a processing in which an addition of the first luminance signal and the second luminance signal in a predetermined ratio becomes the third luminance signal, and an addition of the first color signal and the second color signal in a ratio where the ratio of the first color signal is more than the second color signal becomes the third color signal, the sixth processing is a processing in which an addition of the first luminance signal and the second luminance signal in a predetermined ratio becomes the third luminance signal, and an addition of the first color signal and the second color signal in a ratio where the ratio of the second color signal is more than the first color signal becomes the third color signal, and the seventh processing is a processing in which a simple addition of the first luminance signal and the second luminance becomes the third luminance signal, and a simple addition of the first color signal and the second color signal becomes the third color signal.

5. The imaging apparatus of claim 4, wherein, in the third case, the second signal generating unit performs one of the fifth processing and the sixth processing in a subject scene that prioritizes color reproducibility and performs the seventh processing in a subject scene that prioritizes sensitivity.

6. The imaging apparatus of claim 5, wherein, the subject scene that prioritizes the color reproducibility includes a scene that includes a portrait as a main subject and a scene that includes a landscape as a main subject, the subject scene that prioritizes the sensitivity includes a scene that includes a nightscape, and the second signal generating unit performs the fifth processing in the scene including the landscape and performs the sixth processing in the scene including the portrait.

7. The imaging apparatus of claim 4, further comprising a driving unit that drives the solid-state imaging device, wherein the driving unit switches a first driving in which an exposure time of a first group constituted by the plurality of first photoelectric conversion elements is longer than the exposure time of a second group constituted by the plurality of second photoelectric conversion elements, a second driving in which the exposure time of the second group is longer than the exposure time of the first group, and a third driving in which the exposure times of the first group and the second group are the same, and the driving unit performs the first driving when the first processing is performed by the second signal generating unit, performs the second driving when the third processing is performed by the second signal generating unit, and performs the third driving when the seventh processing is performed by the second signal generating unit.

8. The imaging apparatus of claim 3, further comprising a driving unit that drives the solid-state imaging device, wherein, in a third case where the second light-measuring value is less than the second threshold value, the second signal generating unit performs an eighth processing in which a simple addition of the first luminance signal and the second luminance signal becomes the third luminance signal and a simple addition of the first color signal and the second color signal becomes the third color signal, the driving unit switches a first driving in which an exposure time of a first group constituted by the plurality of first photoelectric conversion elements is longer than the exposure time of a second group constituted by the plurality of second photoelectric conversion elements, a second driving in which the exposure time of the second group is longer than the exposure time of the first group, and a third driving in which the exposure times of the first group and the second group are the same, and in the third case, the driving unit performs one of the first driving and the second driving in a subject scene that prioritizes color reproducibility and performs the third driving in a subject scene that prioritizes sensitivity.

9. The imaging apparatus of claim 8, wherein the subject scene that prioritizes the color reproducibility includes a scene that includes a portrait as a main subject and a scene that includes a landscape as a main subject, the subject scene that prioritizes the sensitivity includes a scene that includes a nightscape, and the driving unit performs the first driving in the scene including the landscape and performs the second driving in the scene including the portrait.

10. The imaging apparatus of claim 1, wherein the solid-state imaging device includes color filters installed above each of the first photoelectric conversion elements and above each of the second photoelectric conversion elements, and a difference in spectral sensitivity characteristic between the first photoelectric conversion element and the second photoelectric conversion element in the pair is obtained according to a difference in spectral sensitivity characteristic between the respective color filters above the first and second photoelectric conversion elements.

11. The imaging apparatus of claim 1, wherein each of the first photoelectric conversion elements and each of the second photoelectric conversion elements are disposed such that a first photoelectric conversion element line in which the first photoelectric conversion elements are arranged in a column direction and a second photoelectric conversion element line in which the second photoelectric conversion elements are arranged in the column direction are alternately arranged in a row direction intersecting the column direction, the second photoelectric conversion element line is disposed to be offset with respect to the first photoelectric conversion element line in the column direction by a half of an array pitch in the column direction of the first photoelectric conversion elements and the second photoelectric conversion elements, and each of the first photoelectric conversion elements and a second photoelectric conversion element adjacent to the first photoelectric conversion element in a predetermined direction form a pair.

12. The imaging apparatus of claim 1, wherein all the first photoelectric conversion elements and the second photoelectric conversion elements included in the solid-state imaging device have approximately the same configuration.

13. An imaging method using a solid-state imaging device that has a plurality of pairs of a first photoelectric conversion element and a second photoelectric conversion element, which have different spectral sensitivity characteristics, respectively, wherein a wavelength range where the first photoelectric conversion element of each pair mainly has a spectral sensitivity and a wavelength range where the second photoelectric conversion element of the pair mainly has a spectral sensitivity fall within wavelength ranges of specific colors of visible light respectively, the plurality of pairs include a plurality of types of pairs having different specific colors, a half-width in a spectral sensitivity characteristic of the second photoelectric conversion element of each pair is wider than a half width in a spectral sensitivity characteristic of the first photoelectric conversion element of the pair, the imaging method comprising:

a first signal generating step that generates a first luminance signal and a first color signal using an imaging signal outputted from the plurality of first photoelectric conversion elements and generates a second luminance signal and a second color signal using an imaging signal outputted from the plurality of second photoelectric conversion elements;

a second signal generating step that generates a third luminance signal for a recordation to a recording medium using at least one of the first luminance signal and the second luminance signal and generates a third color signal for a recordation to the recording medium using at least one of the first color signal and the second color signal; and a light-measuring step that obtains the imaging signals outputted from each of the first photoelectric conversion elements and each of the second photoelectric conversion elements and performs photometry, wherein the second signal generating step changes a generating method of the third luminance signal and a generating method of the third color signal based on results of the photometry performed in the light-measuring step.

14. The imaging method of claim 13, wherein, in a first case where a first light-measuring value obtained by the photometry using the imaging signals outputted from the plurality of first photoelectric conversion elements is equal to or more than a first threshold value which is a proper exposure value determined based on the first light-measuring value, the second signal generating step switches a first processing and a second processing according to the imaging signals outputted from the plurality of first photoelectric conversion elements, the first processing is a processing in which the first luminance signal as it is becomes the third luminance signal, and an addition of the first color signal and the second color signal in a predetermined ratio becomes the third color signal, and the second processing is a processing in which the first luminance signal as it is becomes the third luminance signal, and the first color signal as it is becomes the third color signal.

15. The imaging method of claim 14, wherein, in a second case where the first light-emitting value is less than the first threshold value, and a second light-measuring value obtained by the photometry using the imaging signals outputted from the plurality of second photoelectric conversion elements is equal to or more than a second threshold value which is a proper exposure value determined based on the second light-measuring value, the second signal generating step switches a third processing and a fourth processing according to the imaging signals outputted from the plurality of first photoelectric conversion elements, the third processing is a processing in which the second luminance signal as it is becomes the third luminance signal, and an addition of the first color signal and the second color signal in a predetermined ratio becomes the third color signal, and the fourth processing is a processing in which the second luminance signal as it is becomes the third luminance signal, and the second color signal as it is becomes the third color signal.

16. The imaging method of claim 15, wherein, in a third case where the second light-measuring value is less than the second threshold value, the second signal generating step switches a fifth processing, a sixth processing, and a seventh processing according to a subject scene, the fifth processing is a processing in which an addition of the first luminance signal and the second luminance signal in a predetermined ratio becomes the third luminance signal, and an addition of the first color signal and the second color signal in a ratio where the ratio of the first color signal is more than the second color signal becomes the third color signal, the sixth processing is a processing in which an addition of the first luminance signal and the second luminance signal in a predetermined ratio becomes the third luminance signal, and an addition of the first color signal and the second color signal in a ratio where the ratio of the second color signal is more than the first color signal becomes the third color signal, and the seventh processing is a processing in which an addition of the first luminance signal and the second luminance simply becomes the third luminance signal, and an addition of the first color signal and the second color signal simply becomes the third color signal.

17. The imaging method of claim 16, wherein, in the third case, the second signal generating step performs one of the fifth processing and the sixth processing in a subject scene that prioritizes color reproducibility and performs the seventh processing in a subject scene that prioritizes sensitivity.

18. The imaging method of claim 17, wherein the subject scene that prioritizes the color reproducibility includes a scene that includes a portrait as a main subject and a scene that includes a landscape as a main subject, the subject scene that prioritizes the sensitivity includes a scene that includes a nightscape, and the second signal generating step performs the fifth processing in the scene including the landscape and performs the sixth processing in the scene including the portrait.

19. The imaging method of claim 16, further comprising a driving step that drives the solid-state imaging device, wherein the driving step switches a first driving in which an exposure time of a first group constituted by the plurality of first photoelectric conversion elements is longer than the exposure time of a second group constituted by the plurality of second photoelectric conversion elements, a second driving in which the exposure time of the second group is longer than the exposure time of the first group, and a third driving in which the exposure times of the first group and the second group are the same, and the driving step performs the first driving when the first processing is performed in the second signal generating step, performs the second driving when the third processing is performed in the second signal generating step, and performs the third driving when the seventh processing is performed in the second signal generating step.

20. The imaging method of claim 15, further comprising a driving step that drives the solid-state imaging device,
- wherein, in a third case where the second light-measuring value is less than the second threshold value, the second signal generating step performs an eighth processing in which a simple addition of the first luminance signal and the second luminance signal becomes the third luminance signal and a simple addition of the first color signal and the second color signal becomes the third color signal,
- the driving step switches a first driving in which an exposure time of a first group constituted by the plurality of first photoelectric conversion elements is longer than the exposure time of a second group constituted by the plurality of second photoelectric conversion elements, a second driving in which the exposure time of the second group is longer than the exposure time of the first group, and a third driving in which the exposure times of the first group and the second group are the same, and
- in the third case, the driving step performs one of the first driving and the second driving in a subject scene that prioritizes color reproducibility and performs the third driving in a subject scene that prioritizes sensitivity.

21. The imaging method of claim 20,
- wherein the subject scene that prioritizes the color reproducibility includes a scene that includes a portrait as a main subject and a scene that includes a landscape as a main subject,
- the subject scene that prioritizes the sensitivity includes a scene that includes a nightscape, and
- the driving step performs the first driving in the scene including the landscape and performs the second driving in the scene including the portrait.

22. The imaging method of claim 13,
- wherein the solid-state imaging device includes color filters installed above each of the first photoelectric conversion elements and above each of the second photoelectric conversion elements, and
- a difference in spectral sensitivity characteristic between the first photoelectric conversion element and the second photoelectric conversion element in the pair is obtained according to a difference in spectral sensitivity characteristic between the respective color filters above the first and second photoelectric conversion elements.

23. The imaging method of claim 13,
- wherein each of the first photoelectric conversion elements and each of the second photoelectric conversion elements are disposed such that a first photoelectric conversion element line in which the first photoelectric conversion elements are arranged in a column direction and a second photoelectric conversion element line in which the second photoelectric conversion elements are arranged in the column direction are alternately arranged in a row direction intersecting the column direction,
- the second photoelectric conversion element line is disposed to be offset with respect to the first photoelectric conversion element line in the column direction by a half of an array pitch in the column direction of the first photoelectric conversion elements and the second photoelectric conversion elements, and
- each of the first photoelectric conversion elements and a second photoelectric conversion element adjacent to the first photoelectric conversion element in a predetermined direction form a pair.

24. The imaging method of claim 13, wherein all the first photoelectric conversion elements and the second photoelectric conversion elements included in the solid-state imaging device have approximately the same configuration.

* * * * *